(12) United States Patent
Miyamoto et al.

(10) Patent No.: US 11,192,061 B2
(45) Date of Patent: Dec. 7, 2021

(54) DEHYDRATION DEVICE, DEHYDRATION-COMPRESSION SYSTEM, $CO_2$ RECOVERY SYSTEM, AND DEHYDRATION DEVICE CONTROL METHOD

(71) Applicant: Mitsubishi Heavy Industries Engineering, Ltd., Kanagawa (JP)

(72) Inventors: Osamu Miyamoto, Houston, TX (US); Masayuki Inui, Kanagawa (JP); Takahito Yonekawa, Kanagawa (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 219 days.

(21) Appl. No.: 16/696,107

(22) Filed: Nov. 26, 2019

(65) Prior Publication Data
US 2021/0154617 A1 May 27, 2021

(51) Int. Cl.
*B01D 3/02* (2006.01)
*B01D 53/14* (2006.01)
*B01D 53/18* (2006.01)
*B01D 53/26* (2006.01)

(52) U.S. Cl.
CPC ........ *B01D 53/1412* (2013.01); *B01D 3/02* (2013.01); *B01D 53/1418* (2013.01); *B01D 53/1425* (2013.01); *B01D 53/1475* (2013.01); *B01D 53/18* (2013.01); *B01D 53/263* (2013.01)

(58) Field of Classification Search
CPC ...... B01D 3/02; B01D 3/143; B01D 53/1412; B01D 53/1418; B01D 53/1425; B01D 53/1475; B01D 53/18; B01D 53/263
See application file for complete search history.

(56) References Cited

U.S. PATENT DOCUMENTS 9,352,273 B2 5/2016 Inui et al.
2015/0238893 A1\* 8/2015 Inui ................... B01D 53/1475
96/234

FOREIGN PATENT DOCUMENTS

WO 2015-129628 A1 9/2015

\* cited by examiner

*Primary Examiner* — Cabrena Holecek
(74) *Attorney, Agent, or Firm* — Osha Bergman Watanabe & Burton LLP

(57) ABSTRACT

A dehydration device removes moisture from a process gas compressed by a compressor, and includes a contactor that causes a dehydration solvent to absorb the moisture, a still column that separates the moisture from the dehydration solvent, a carrying line that carries the dehydration solvent from the contactor to the still column, a dehydration solvent conveying pump, a bypass line that couples the carrying lines upstream and downstream of the dehydration solvent conveying pump, a first on-off valve disposed in the bypass line, and a control device. In a case where the pressure detected by a pressure sensor is lower than a first predetermined pressure, the control device closes the first on-off valve and causes the conveying pump to operate, whereas in a case where the pressure detected by the pressure sensor is equal to or higher than the first predetermined pressure, the control device opens the first on-off valve and causes the conveying pump to stop.

10 Claims, 10 Drawing Sheets

DEHYDRATION DEVICE, DEHYDRATION-COMPRESSION SYSTEM, $CO_2$ RECOVERY SYSTEM, AND DEHYDRATION DEVICE CONTROL METHOD

TECHNICAL FIELD

The present disclosure relates to a dehydration device for removing moisture from a moisture-containing process gas, a dehydration-compression system, a $CO_2$ recovery system, and a dehydration device control method.

BACKGROUND ART

A dehydration-compression system (e.g., U.S. Pat. No. 9,352,273) recovers $CO_2$ from exhaust gas discharged from an industrial facility, for example, a boiler or a gas turbine, and dehydrates/compresses the recovered $CO_2$. For effective utilization of this dehydrated/compressed $CO_2$, there are plans to inject the $CO_2$ into an oilfield by the enhanced oil recovery (EOR) method, or store it in an aquifer aiming at combating global warming.

If moisture ($H_2O$) remains in the compressed $CO_2$, the moisture can condense during a transport process through a pipeline or the like. The condensed moisture causes corrosion of the pipeline and its ancillary equipment/machines, clogging of the pipeline due to generation of hydrate, and the like. Accordingly, in the dehydration-compression system disclosed in the specification of U.S. Pat. No. 9,352,273, moisture is removed from $CO_2$ by causing a dehydration solvent to come into contact with moisture-containing $CO_2$ supplied from a $CO_2$ recovery device and absorb the moisture.

In the dehydration-compression system according to U.S. Pat. No. 9,352,273, $CO_2$ and a dehydration solvent are brought into contact in a contactor, causing the dehydration solvent to absorb moisture, and the dehydration solvent that has absorbed moisture is supplied to a still column via a dehydration solvent carrying line. In the still column, moisture is removed from the dehydration solvent by heating the dehydration solvent that has absorbed moisture. The dehydration solvent from which moisture has been removed is resupplied to the contactor. In Patent Literature 1, $CO_2$ that has been compressed by a compressor is supplied to the dehydration device. For this reason, in the dehydration device, the interior of the contactor is pressurized by the compressed $CO_2$, and this pressure causes the dehydration solvent to be carried from the contactor to the still column via the dehydration solvent carrying line.

SUMMARY OF INVENTION

Technical Problem

However, in the dehydration-compression system according to U.S. Pat. No. 9,352,273, if $CO_2$ that has not been compressed by the compressor is supplied to the contactor during startup while the compressor is not operating, the interior of the contactor is not pressurized by $CO_2$, and therefore the dehydration solvent is not carried from the contactor to the still column. In this case, the dehydration-compression system is incapable of performing the process of removing moisture from the dehydration solvent, and the $CO_2$ supplied from the $CO_2$ recovery device is discharged to the outside without the moisture being removed. For this reason, there is a possibility that $CO_2$ containing residual moisture will cause trouble such as corrosion in downstream equipment.

The present disclosure has been devised in light of such circumstances, and an object thereof is to provide a dehydration device, a dehydration-compression system, a $CO_2$ recovery system, and a dehydration device control method capable of performing a process of removing moisture from a process gas with a dehydration solvent to prevent the occurrence of trouble such as corrosion in downstream equipment, even in cases where the interior of an absorbing unit is not sufficiently pressurized by the process gas.

Solution to Problem

A dehydration device according to one aspect of the present disclosure is a dehydration device that removes moisture from a moisture-containing process gas compressed by a compressor, and is provided with: an absorbing unit that causes the process gas to come into contact with a dehydration solvent, causing the dehydration solvent to absorb the moisture and remove the moisture from the process gas; a first pressure detecting unit that detects an internal pressure of the absorbing unit; a distilling unit that heats the dehydration solvent that has absorbed the moisture in the absorbing unit, and separates the moisture from the dehydration solvent; a carrying line that carries the dehydration solvent from the absorbing unit to the distilling unit; a conveying pump, disposed in the carrying line, that suctions the dehydration solvent carried from the absorbing unit and discharges the dehydration solvent toward the distilling unit; a first bypass line that couples the carrying line upstream of the conveying pump and the carrying line downstream of the conveying pump; a first on-off valve disposed in the first bypass line; and a control unit that controls the conveying pump and the first on-off valve. The control unit is configured to close the first on-off valve and cause the conveying pump to operate in a case where the pressure detected by the first pressure detecting unit is lower than a first predetermined pressure, whereas the control unit is configured to open the first on-off valve and cause the conveying pump to stop in a case where the pressure detected by the first pressure detecting unit is equal to or higher than the first predetermined pressure.

A dehydration device control method according to one aspect of the present disclosure is a dehydration device control method that removes moisture from a moisture-containing process gas compressed by a compressor. The dehydration device includes: an absorbing unit that causes the process gas to come into contact with a dehydration solvent, causing the dehydration solvent to absorb the moisture and remove the moisture from the process gas; a distilling unit that heats the dehydration solvent that has absorbed the moisture in the absorbing unit, and separates the moisture from the dehydration solvent; a carrying line that carries the dehydration solvent from the absorbing unit to the distilling unit; a conveying pump, disposed in the carrying line, that suctions the dehydration solvent carried from the absorbing unit and discharges the dehydration solvent toward the distilling unit; a first bypass line that couples the carrying line upstream of the conveying pump and the carrying line downstream of the conveying pump; and a first on-off valve disposed in the first bypass line. The method includes: a first pressure detecting step of detecting an internal pressure of the absorbing unit; a first controlling step of closing the first on-off valve and causing the conveying pump to operate in a case where the pressure detected in the first pressure detecting step is lower than a first predetermined pressure; and a second controlling step of opening the first on-off valve and stopping the conveying pump in a case where the pressure detected in the first pressure detecting step is equal to or higher than the first predetermined pressure.

Advantageous Effects of Invention

According to the present disclosure, it is possible to provide a dehydration device, a dehydration-compression system, a $CO_2$ recovery system, and a dehydration device control method capable of performing a process of removing moisture from a process gas with a dehydration solvent to prevent the occurrence of trouble such as corrosion in downstream equipment, even in cases where the interior of an absorbing unit is not sufficiently pressurized by the process gas.

DESCRIPTION OF EMBODIMENTS

Figure 1:
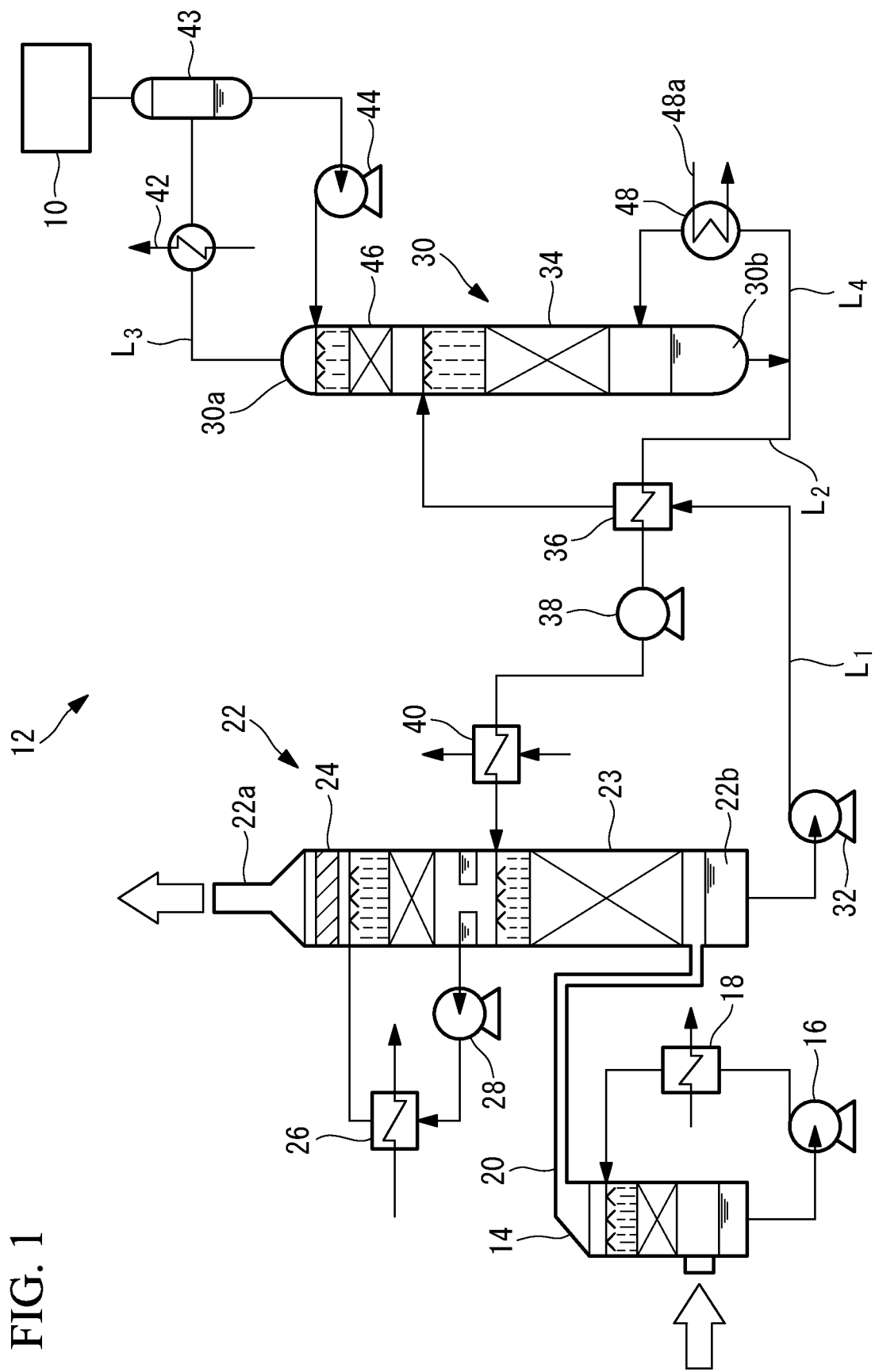
FIG. 1 is a schematic view of a $CO_2$ recovery device.

Embodiments of a dehydration-compression system and a $CO_2$ recovery system according to the present disclosure will be described below with reference to the drawings. FIG. 1 is a schematic view of a $CO_2$ recovery device to be installed in the $CO_2$ recovery system. A $CO_2$ recovery device 12 includes a cooling tower 14, a $CO_2$ absorbing tower 22, and an absorbing liquid regenerating tower 30.

Exhaust gas containing $CO_2$ discharged from an industrial facility, for example, a boiler or a gas turbine, is supplied through a blower (not shown) to the cooling tower 14. The exhaust gas supplied to the cooling tower 14 is cooled by cooling water. The cooling water after cooling the exhaust gas is supplied through a cooler 18 back to the cooling tower 14 by a pump 16, and sprayed inside the cooling tower.

The cooled exhaust gas containing $CO_2$ is supplied through an exhaust gas line 20 from a lower part of the $CO_2$ absorbing tower 22. In the $CO_2$ absorbing tower 22, an alkanolamine-based $CO_2$ absorbing liquid (amine solution), for example, is brought into countercurrent contact with the exhaust gas while passing through a filler 23. This causes the $CO_2$ in the exhaust gas to be absorbed into the $CO_2$ absorbing liquid, so that the $CO_2$ is removed from the exhaust gas discharged from the industrial facility. Purified gas with the $CO_2$ removed is discharged from a tower top part 22a of the $CO_2$ absorbing tower 22.

The purified gas contains steam, etc.; a mist eliminator 24 is provided in an upper part of the $CO_2$ absorbing tower 22 to separate and remove the steam, etc. from the purified gas by condensing the steam, etc. The $CO_2$ absorbing tower 22 is further provided with a cooler 26 which is installed outside the $CO_2$ absorbing tower 22, and a pump 28 which circulates part of the condensed water between the cooler 26 and the $CO_2$ absorbing tower 22. As the condensed water, etc. cooled in the cooler 26 and supplied to the upper part of the $CO_2$ absorbing tower 22 maintains the mist eliminator 24 at a low temperature, the purified gas passing through the mist eliminator 24 is more reliably cooled.

The $CO_2$ absorbing liquid having absorbed the $CO_2$ in the $CO_2$ absorbing tower 22 is accumulated in a tower bottom part 22b, and supplied by a pump 32, from a liquid feeding line $L_1$ connecting the tower bottom part 22b of the $CO_2$ absorbing tower 22 and an upper part of the absorbing liquid regenerating tower 30, to the absorbing liquid regenerating tower 30, and is sprayed toward a filler 34 inside the absorbing liquid regenerating tower. A liquid feeding line $L_2$ connecting a tower bottom part 30b of the absorbing liquid regenerating tower 30 and the upper part of the $CO_2$ absorbing tower 22 is provided between the $CO_2$ absorbing tower 22 and the absorbing liquid regenerating tower 30. A heat exchanger 36 for exchanging heat between a rich solution ($CO_2$ absorbing liquid having absorbed $CO_2$) and a lean solution ($CO_2$ absorbing liquid with $CO_2$ removed) is provided in an intersecting portion between the liquid feeding line $L_1$ and the liquid feeding line $L_2$. In the heat exchanger 36, the rich solution is heated while the lean solution is cooled.

Due to concurrent contact while passing through the filler 34 in the absorbing liquid regenerating tower 30, the $CO_2$ absorbing liquid having absorbed the $CO_2$ (rich solution) undergoes an endothermic reaction, which causes release of the $CO_2$. By the time the rich solution reaches the tower bottom part 30b of the absorbing liquid regenerating tower 30, a large part of the $CO_2$ has been removed, and the rich solution is regenerated as the lean solution. The regenerated lean solution is supplied by a pump 38 through a lean solution cooling device (not shown) back to the $CO_2$ absorbing tower 22 to be reused as the $CO_2$ absorbing liquid.

The lean solution regenerated by releasing the $CO_2$ in the absorbing liquid regenerating tower 30 is returned by the pump 38 through the liquid feeding line $L_2$ to the $CO_2$ absorbing tower 22. While being returned, the lean solution is cooled in the heat exchanger 36 by heat exchange with the absorbing liquid, which is supplied from the $CO_2$ absorbing tower 22 to the absorbing liquid regenerating tower 30, and then cooled by a water-cooling cooler 40 to a temperature suitable for absorbing $CO_2$.

Reference sign $L_3$ denotes a $CO_2$ discharge line connected with a tower top part 30a of the absorbing liquid regenerating tower 30. The $CO_2$ discharged from the absorbing liquid regenerating tower 30 through the $CO_2$ discharge line $L_3$ is cooled through a cooler 42, which uses cooling water, before being supplied to a scrubber 43. The $CO_2$ supplied to the scrubber 43 is separated from steam. The separated $CO_2$ is supplied to the dehydration-compression system 10. The condensed water separated in the scrubber 43 is returned by the pump 44 to the upper part of the absorbing liquid regenerating tower 30. The returned condensed water cools a condensing part 46 to suppress release of the $CO_2$ absorbing liquid, etc.

Part of the $CO_2$ absorbing liquid accumulated in the tower bottom part 30b of the absorbing liquid regenerating tower 30 is supplied through the circulating passage $L_4$ to a reboiler 48, and heated by heat exchange with high-temperature steam flowing in a steam pipe 48a, before being returned into the absorbing liquid regenerating tower 30. This heating process causes the $CO_2$ to be released from the $CO_2$ absorbing liquid in the tower bottom part 30b, and moreover, the $CO_2$ is released from the $CO_2$ absorbing liquid also during gas-liquid contact above the filler 34 which is indirectly heated.

First Embodiment

Figure 2:
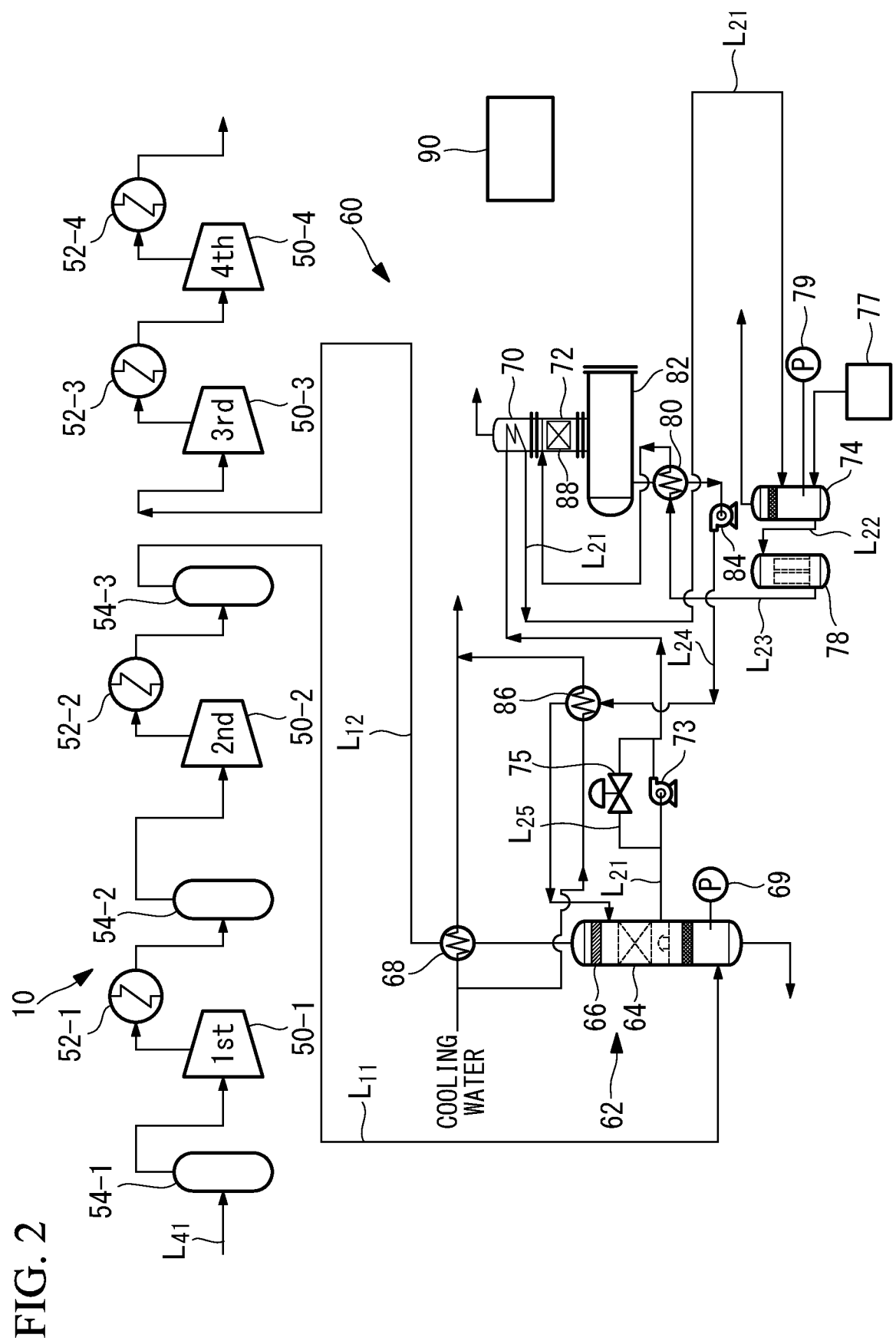
FIG. 2 is a configuration diagram of a dehydration-compression system according to a first embodiment.

FIG. 2 is a configuration diagram of a dehydration-compression system according to a first embodiment.

The dehydration-compression system 10 includes multiple compressors 50 for compressing a process gas supplied from the $CO_2$ recovery device 12. The multiple compressors 50 are connected in series with respect to a flow of the process gas. This process gas is $CO_2$ containing $H_2O$.

FIG. 2 shows the dehydration-compression system 10 in a case where a dehydration device 60 is installed between adjacent compressors of the multiple compressors 50. Hereinafter, the compressors on the upstream side of the dehydration device 60 will be referred to as "upstream stage-side compressors", while the compressors on the downstream side of the dehydration device 60 will be referred to as "downstream stage-side compressors" to describe the embodiment. In the dehydration-compression system 10, four compressors 50-1 to 50-4 are installed, and the dehydration device 60 is connected between the compressor 50-2 and the compressor 50-3. The compressors 50-1 and 50-2 constitute the upstream stage-side compressors, while the compressors 50-3 and 50-4 constitute the downstream stage-side compressors.

Nevertheless, the number of the compressors is not limited to four in this embodiment. In addition, the installation position of the dehydration device 60 is not limited to that shown in FIG. 2. For example, the dehydration device 60 may be installed between the compressor 50-1 and the compressor 50-2. Alternatively, the dehydration device 60 may be installed on the upstream side of the multiple compressors 50 (i.e., on the upstream side of the compressor 50-1), or may be installed on the downstream side of the multiple compressors 50 (i.e., on the downstream side of the compressor 50-4).

The compressors 50-1 to 50-4 respectively include coolers 52-1 to 52-4 on the downstream side in the gas flow. The coolers 52-1 to 52-4 cool the process fluid which has been heated by being compressed in the compressors 50-1 to 50-4.

The compressor 50-1 on the most upstream side is connected with a scrubber 54-1 on the upstream side. The scrubber 54-1 removes $H_2O$ mist which is entrained in the $CO_2$ recovered in the $CO_2$ recovery device 12 from the scrubber 43. Scrubbers 54-2 and 54-3 are installed on the downstream side of the coolers 52-1 and 52-2, respectively. The scrubbers 54-2 and 54-3 recover the $H_2O$ which has been condensed as the saturated ratio of the $H_2O$ has decreased due to compression.

In the present embodiment, in the compressors 50-1 and 50-2 disposed upstream of the dehydration device 60, a member having an inner circumferential surface that makes contact with the process gas is made of stainless steel. On the other hand, in the compressors 50-3 and 50-4 disposed downstream of the dehydration device 60, a member having an inner circumferential surface that makes contact with the process gas is made of carbon steel.

The compressors 50-1 and 50-2 are made of stainless steel to raise the resistance to corrosion due to moisture, because a moisture-containing process gas is supplied from the $CO_2$ recovery device 12. The compressors 50-3 and 50-4 are made of carbon steel because, since a process gas with the moisture removed by the dehydration device 60 is supplied, the compressors 50-3 and 50-4 are not susceptible to corrosion due to moisture.

The dehydration device 60 according to the present embodiment is provided with a contactor (absorbing unit) 62, a still column (distilling unit) 72, a dehydration solvent conveying pump 73, a flash drum (evaporating unit) 74, a reboiler 82, and a dehydration control device (control unit) 90. The contactor 62 is a device that causes the process gas ($CO_2$) to come into contact with a dehydration solvent, causing the dehydration solvent to absorb moisture and remove the moisture from the process gas. The still column 72 is a device that heats the dehydration solvent that has absorbed moisture in the contactor 62 to separate the moisture from the dehydration solvent.

The $CO_2$ (process gas) after being compressed in the compressor 50-2 is supplied, via the $CO_2$ supply line $L_{11}$, from a lower part of the contactor 62 into the contactor 62. A packing 64 is housed in the contactor 62, and the dehydration solvent is diffused from above the packing. The dehydration solvent is a liquid capable of absorbing the $H_2O$ present in the $CO_2$, and triethylene glycol (TEG) and diethylene glycol (DEG) are specific examples of the dehydration solvent. While the diffused dehydration solvent is passing through the packing 64, the $CO_2$ and the dehydration solvent come into countercurrent contact with each other. This causes the $H_2O$ present in the $CO_2$ to be absorbed into the dehydration solvent. Part of the $CO_2$ (about 0.2 to 5%) is also absorbed into the dehydration solvent.

A mist eliminator 66 is installed in an upper part of the contactor 62. The $CO_2$ with the $H_2O$ removed (dry $CO_2$) passes through the mist eliminator 66 and is discharged to the dry $CO_2$ supply line (dry $CO_2$ carrying passage; discharge line) $L_{12}$. The dry $CO_2$ discharged from the contactor 62 is cooled through the cooler 68 provided in the dry $CO_2$ supply line $L_{12}$, and thereafter supplied through the dry $CO_2$ supply line $L_{12}$ to the downstream stage-side compressors 50-3 and 50-4 to be compressed there. The $CO_2$ after being compressed in the downstream stage-side compressors 50-3 and 50-4 is utilized for the enhanced oil recovery (EOR) method, for example.

The dehydration solvent having absorbed the $H_2O$ and the $CO_2$ is discharged from the contactor 62 through a dehydration solvent carrying line $L_{21}$ under the packing 64. The dehydration solvent carrying line $L_{21}$ passes from the contactor 62 through the inside of a reflux condenser 70 and is connected with the flash drum 74.

In the case where an internal pressure Pco of the contactor 62 is equal to or higher than a first predetermined pressure Ppr1, the dehydration solvent existing below the packing 64 of the contactor 62 is carried from the contactor 62 to the flash drum 74 through the dehydration solvent carrying line Ln, due to the pressure difference between the internal pressure Pco of the contactor 62 and an internal pressure Pfl of the flash drum 74 described later. Herein, it is assumed that the internal pressure Pfl of the flash drum 74 is maintained at a second predetermined pressure Ppr2.

Consequently, in the case where the pressure difference between the internal pressure Pco of the contactor 62 and the internal pressure Pfl of the flash drum 74 is equal to or higher than Ppr1-Ppr2, the dehydration solvent can be carried from the contactor 62 to the flash drum 74 through the dehydration solvent carrying line Ln by the pressure of the process gas itself.

The contactor 62 is provided with a pressure sensor (first pressure detecting unit) 69 that detects the internal pressure of the contactor 62. The pressure sensor 69 detects the internal pressure of the contactor 62 and transmits the detected pressure to the dehydration control device 90.

A dehydration solvent conveying pump 73 is disposed in the dehydration solvent carrying line $L_{21}$ that carries the dehydration solvent from the contactor 62 to the flash drum 74. The dehydration solvent conveying pump 73 suctions the dehydration solvent carried from the contactor 62, and discharges the dehydration solvent toward the still column 72. The operation of the dehydration solvent conveying pump 73 is controlled by a control signal transmitted from the dehydration control device 90 via a signal line (not illustrated).

The dehydration device 60 is provided with a bypass line (first bypass line) $L_{25}$ that couples the dehydration solvent carrying line $L_{21}$ on the upstream side and the dehydration solvent carrying line $L_{21}$ on the downstream side of the dehydration solvent conveying pump 73. The dehydration device 60 is provided with a first on-off valve 75 disposed in the bypass line (first bypass line) $L_{25}$. The on-off state of the first on-off valve 75 is controlled by a control signal transmitted from the dehydration control device 90 via a signal line (not illustrated).

The reflux condenser 70 houses the dehydration solvent carrying line $L_{21}$. As will be described later, gas containing $CO_2$ and $H_2O$ at a high temperature of about 100 to 200° C. flows inside the reflux condenser 70. The dehydration solvent passing through the dehydration solvent carrying line $L_{21}$ is increased in temperature by indirect heat exchange with this high-temperature gas containing $CO_2$ and $H_2O$. The dehydration solvent after heat exchange in the reflux condenser 70 is carried through the dehydration solvent carrying line $L_{21}$ to the upper part of the flash drum 74.

The flash drum 74 is disposed between the dehydration solvent carrying line $L_{21}$ and the dehydration solvent carrying line $L_{22}$, and is a device that reduces the pressure of the dehydration solvent and thereby causes the $CO_2$ and $H_2O$ absorbed by the dehydration solvent to evaporate. The flash drum 74 is supplied with a compressed gas (for example, compressed nitrogen or compressed air) at a predetermined pressure (for example, a pressure set in the range from 5 $kg/cm^2$ or greater to 10 $kg/cm^2$ or less) from a compressed gas source 77.

Note that the pressure of the process gas supplied to the dehydration-compression system 10 from the $CO_2$ recovery device 12 is lower than the pressure of the compressed gas supplied from the compressed gas source 77. The compressed gas source 77 supplies, to the flash drum 74, compressed gas of higher pressure than the pressure of the process gas supplied to the dehydration-compression system 10 from the $CO_2$ recovery device 12.

The flash drum 74 is provided with a pressure sensor (second pressure detecting unit) 79 that detects the internal pressure Pfl of the flash drum 74. The pressure sensor 79 detects the internal pressure of the flash drum 74 and transmits the detected pressure to the dehydration control device 90. The dehydration control device 90 controls how the compressed gas source 77 supplies the compressed gas such that the pressure Pfl detected by the pressure sensor 79 becomes the second predetermined pressure Ppr2.

Herein, the second predetermined pressure Ppr2 is a pressure that is lower than the first predetermined pressure Ppr1, enabling the dehydration solvent existing in the flash drum 74 to be carried from the flash drum 74 to the still column 72 through the dehydration solvent carrying line $L_{22}$ and the dehydration solvent carrying line $L_{23}$. In the case where the internal pressure Pfl of the flash drum 74 is equal to or higher than the second predetermined pressure Ppr2, the dehydration solvent existing in the flash drum 74 is carried from the flash drum 74 to the still column 72 through the dehydration solvent carrying line $L_{22}$ and the dehydration solvent carrying line $L_{23}$, due to the pressure difference between the internal pressure Pfl of the flash drum 74 and an internal pressure Psc of the still column 72. Herein, it is assumed that the internal pressure Psc of the still column 72 is maintained at an atmospheric pressure Pap.

Consequently, in the case where the pressure difference between the internal pressure Pfl of the flash drum 74 and the internal pressure Psc of the still column 72 is equal to or higher than Ppr2-Pap, the dehydration solvent can be carried from the flash drum 74 to the still column 72 through the dehydration solvent carrying line $L_{22}$ and the dehydration solvent carrying line $L_{23}$ by the pressure of the process gas itself.

The dehydration solvent supplied into the flash drum 74 is flashed (evaporated) inside the flash drum 74. During this process, a large part of the $CO_2$ (80% to 90%) and a fraction of the $H_2O$ that have been absorbed are desorbed from the dehydration solvent. Thereby, the $CO_2$ is recovered from the dehydration solvent. The dehydration solvent is accumulated in the bottom part of the flash drum 74. The $H_2O$ and a slight amount (10% to 20%) of the $CO_2$ remain absorbed in the dehydration solvent.

The $CO_2$ and $H_2O$ recovered inside the flash drum 74 are discharged from the flash drum 74. The recovered $CO_2$ and $H_2O$ are supplied from the flash drum 74 to a process fluid flow passage $L_{41}$ on the gas upstream side of the compressor 50-1, for example. The $CO_2$ recovered by the dehydration device 60 is compressed by the compressors 50-1 and 50-2 together with the $CO_2$ recovered by the $CO_2$ recovery device 12, and is carried back to the dehydration device 60. The $H_2O$ recovered by the dehydration device 60 is removed from the $CO_2$ by passing through the scrubbers 54-1 to 54-3. Residual $H_2O$ is further removed from the $CO_2$ in the contactor 62 of the dehydration device 60 as described above.

The dehydration solvent carrying line $L_{22}$ connects the flash drum 74 and a filter 78. The dehydration solvent is carried through the dehydration solvent carrying line $L_{22}$ from the bottom part of the flash drum 74 to the filter 78. Solid matters (rust, etc.) contained in the dehydration solvent are removed in the filter 78.

The dehydration solvent carrying line $L_{23}$ connects the filter 78 and the still column 72. The dehydration solvent is discharged from the filter 78, and carried through the dehydration solvent carrying line $L_{23}$ to the still column 72. A heat exchanger 80 is installed midway in the dehydration solvent carrying line $L_{23}$. In the heat exchanger 80, heat exchange is performed between the dehydration solvent discharged from the filter 78 and the dehydration solvent discharged from the reboiler 82 to be described later. The dehydration solvent flowing through the dehydration solvent carrying line $L_{23}$ is heated to about 150° C. by this heat exchange.

The still column 72 houses a packing 88. The dehydration solvent supplied from the dehydration solvent carrying line $L_{23}$ is heated in the still column 72, which causes the $CO_2$ and the $H_2O$ remaining in the dehydration solvent to be released from the dehydration solvent and separated from the dehydration solvent. The released $CO_2$ and $H_2O$ pass through the reflux condenser 70, and are discharged from the reflux condenser 70. While passing through the space where the dehydration solvent carrying line $L_{21}$ is housed as mentioned above, the released $CO_2$ and $H_2O$ are utilized for heat exchange with the dehydration solvent flowing through the dehydration solvent carrying line $L_{21}$.

The dehydration solvent having released the $CO_2$ and the $H_2O$ inside the still column 72 is carried to the reboiler 82 and heated there. The dehydration solvent carrying line $L_{24}$ connects the reboiler 82 and the contactor 62. The heated dehydration solvent is discharged by actuation of the pump 84 from the reboiler 82 through the dehydration solvent carrying line $L_{24}$. In the heat exchanger 80 installed at an intermediate position of the dehydration solvent carrying line $L_{24}$, heat exchange is performed between the dehydration solvent flowing through the dehydration solvent carrying line $L_{23}$ and the dehydration solvent flowing through the dehydration solvent carrying line $L_{24}$. The dehydration solvent after heat exchange is cooled in the cooler 86 before being circulated to the contactor 62.

The dehydration solvent transferred to the reboiler 82 includes a slight amount of the $CO_2$ and the $H_2O$. When the dehydration solvent is heated in the reboiler 82, the residual $CO_2$ and $H_2O$ are released from the dehydration solvent. The reboiler 82 is communicated with the still column 72. The $CO_2$ and the $H_2O$ released inside the reboiler 82 pass through the reflux condenser 70, and are discharged from the reflux condenser 70.

In terms of the $CO_2$ recovery amount of the entire $CO_2$ recovery system, the amount of $CO_2$ discharged from the reflux condenser 70 is slight. The gas discharged from reflux condenser 70 is released to the outside of the dehydration device 60. In this embodiment, since the $CO_2$ generated during regeneration of the dehydration solvent in the dehydration device 60 is carried to the upstream side of the contactor 62 and dehydrated again, the amount of $CO_2$ loss can be reduced.

The dehydration control device 90 is a device that controls each unit of the dehydration device 60. As described later, the dehydration control device 90 controls the operating state of the dehydration solvent conveying pump 73 and the on-off state of the first on-off valve 75 according to the internal pressure of the contactor 62 transmitted from the pressure sensor 69.

Figure 3:
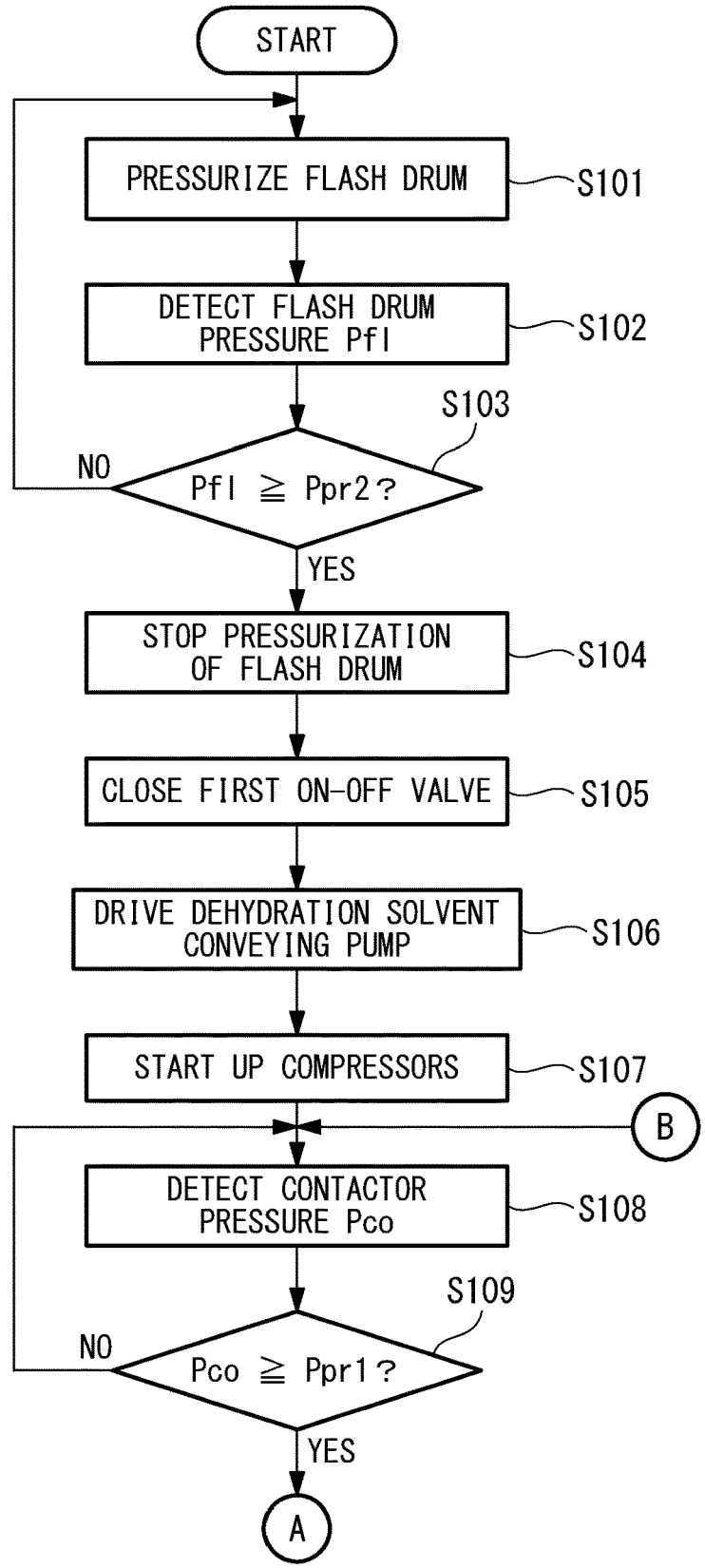
FIG. 3 is a flowchart illustrating processes executed by the dehydration-compression system according to the first embodiment.
Figure 4:
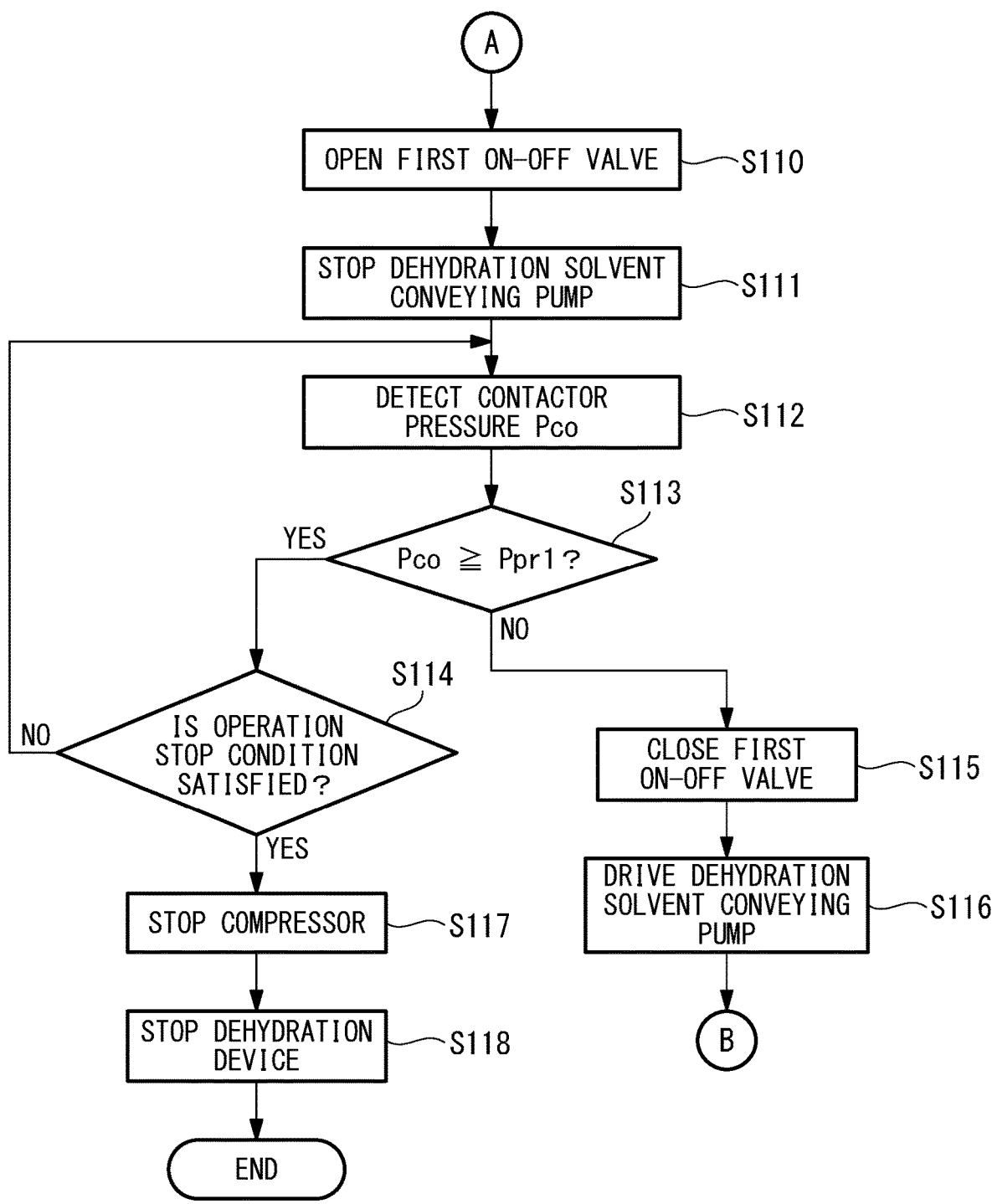
FIG. 4 is a flowchart illustrating processes executed by the dehydration-compression system according to the first embodiment.

Next, processes executed by the dehydration-compression system 10 according to the present embodiment will be described with reference to the drawings. FIGS. 3 and 4 are flowcharts illustrating processes executed by the dehydration-compression system 10 according to the present embodiment. Each process illustrated in FIGS. 3 and 4 is executed by the dehydration control device 90 that controls the dehydration device 60 and a compression control device (not illustrated) that controls the multiple compressors 50.

The processes illustrated in the flowcharts of FIGS. 3 and 4 are executed during startup of the dehydration-compression system 10. The processes illustrated in the flowcharts of FIGS. 3 and 4 are started when the multiple compressors 50 and the dehydration device 60 of the dehydration-compression system 10 are stopped. Because the multiple compressors 50 are stopped during startup of the dehydration-compression system 10, the process gas supplied from the $CO_2$ recovery device 12 is not compressed by the compressor 50-1 and the compressor 50-2.

During startup of the dehydration-compression system 10, the process gas supplied to the contactor 62 is not compressed, and compressed gas is not being supplied to the flash drum 74. For this reason, the pressure difference between the internal pressure Pco of the contactor 62 and the internal pressure Pfl of the flash drum 74 does not become equal to or higher than Ppr1-Ppr2, and the dehydration solvent cannot be carried from the contactor 62 to the flash drum 74 through the dehydration solvent carrying line $L_{21}$ by the pressure of the process gas itself.

The processes in the flowcharts illustrated in FIGS. 3 and 4 described below include a process of conveying the dehydration solvent with the dehydration solvent conveying pump 73 in the case where the dehydration solvent cannot be conveyed from the contactor 62 to the flash drum 74 by the pressure of the process gas itself.

In step S101, the dehydration control device 90 controls how the compressed gas source 77 supplies the compressed gas to pressurize the flash drum 74 to the second predetermined pressure Ppr2.

In step S102, the dehydration control device 90 transmits a control signal causing the pressure sensor 79 to detect the internal pressure Pfl of the flash drum 74. The dehydration control device 90 detects the pressure Pfl transmitted from the pressure sensor 79 in response to the control signal transmitted to the pressure sensor 79.

In step S103, the dehydration control device 90 determines whether or not the pressure Pfl transmitted from the pressure sensor 79 is equal to or higher than the second predetermined pressure Ppr2, and if YES, the process proceeds to step S104. If NO, the process of step S101 is re-executed.

In step S104, the dehydration control device 90 stops the pressurization of the flash drum 74 by stopping the supply of compressed gas from the compressed gas source 77 to the flash drum 74.

In step S105, the dehydration control device 90 controls the first on-off valve 75 provided in the bypass line $L_{25}$ to close the first on-off valve 75.

In step S106, the dehydration control device 90 drives the dehydration solvent conveying pump 73 to convey the dehydration solvent from the contactor 62 to the flash drum 74 through the dehydration solvent carrying line $L_{21}$. The dehydration solvent conveying pump 73 discharges the dehydration solvent supplied from the contactor 62 toward the flash drum 74, conveying the dehydration solvent through the dehydration solvent carrying line $L_{21}$.

Because the dehydration solvent conveying pump 73 is driven in step S106, the dehydration solvent is conveyed from the contactor 62 to the flash drum 74. Also, because the internal pressure of the flash drum 74 is equal to or higher than the second predetermined pressure Ppr2, the dehydration solvent is conveyed from the flash drum 74 to the still column 72. Furthermore, by the action of the pump 84, the dehydration solvent is conveyed to the contactor 62 through the dehydration solvent carrying line $L_{24}$. In this way, the dehydration solvent circulates in order from the contactor 62, to the flash drum 74, to the still column 72, and to the contactor 62.

In step S107, the compression control device (not illustrated) starts up all of the multiple compressors 50 and starts compression of the process gas supplied from the $CO_2$ recovery device 12. The compressor 50-1 and the compressor 50-2 compress the moisture-containing process gas supplied from the $CO_2$ recovery device 12, and supply the compressed process gas to the $CO_2$ supply line $L_{11}$ of the dehydration device 60. The compressor 50-3 and the compressor 50-4 compress the process gas with moisture removed that is supplied from the dehydration device 60, and supply the compressed process gas to downstream equipment.

In step S108, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S109, the dehydration control device 90 determines whether or not the pressure Pco transmitted from the pressure sensor 69 is equal to or higher than the first predetermined pressure Ppr1, and if YES, the process proceeds to step S110. If NO, the process of step S108 is re-executed.

In step S110, the dehydration control device 90 transmits a control signal for putting the first on-off valve 75 in the on state. The first on-off valve 75 enters the on state in response to the control signal transmitted from the dehydration control device 90. The first on-off valve 75 is put into the on state because the pressure Pco will become equal to or higher than the first predetermined pressure Ppr1, making it possible to convey the dehydration solvent from the contactor 62 to the flash drum 74 through the dehydration solvent carrying line $L_{21}$ by the pressure of the process gas itself.

In step S111, the dehydration control device 90 transmits a control signal for stopping the dehydration solvent conveying pump 73. In response to the control signal received from the dehydration control device 90, the dehydration solvent conveying pump 73 stops the action of suctioning and discharging the dehydration solvent.

In step S112, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S113, the dehydration control device 90 determines whether or not the pressure Pco transmitted from the pressure sensor 69 is equal to or higher than the first predetermined pressure Ppr1, and if YES, the process proceeds to step S114. If NO, the process proceeds to step S115.

In step S114, the dehydration control device 90 and the compression control device determine whether or not an operation stop condition for stopping the dehydration-compression system 10 is satisfied, and if YES, the process proceeds to step S117. If NO, step S112 is re-executed.

In step S115, the dehydration control device 90 controls the first on-off valve 75 provided in the bypass line $L_{25}$ to close the first on-off valve 75.

In step S116, the dehydration control device 90 drives the dehydration solvent conveying pump 73. Because the internal pressure Pco of the contactor 62 has fallen below the first predetermined pressure Ppr1, by driving the dehydration solvent conveying pump 73, the dehydration solvent continues to be conveyed from the contactor 62 to the flash drum 74. The dehydration solvent conveying pump 73 discharges the dehydration solvent supplied from the contactor 62 toward the flash drum 74, conveying the dehydration solvent through the dehydration solvent carrying line $L_{21}$.

In step S117, because the operation stop condition for stopping the dehydration-compression system 10 is satisfied, the compression control device stops all of the multiple compressors 50. By stopping the compressors 50, the supply of process gas from the compressors 50 to the $CO_2$ carrying line $L_{11}$ stops.

In step S118, because the operation stop condition for stopping the dehydration-compression system 10 is satisfied, the dehydration control device 90 stops the dehydration device 60. Each unit of the dehydration device 60 stops operation in response to the control signal transmitted from the dehydration control device 90.

As above, according to the dehydration device 60 of the present embodiment, for example, during startup when a process gas not sufficiently compressed by the compressors 50 is supplied and the internal pressure Pco of the contactor 62 detected by the pressure sensor 69 is lower than the first predetermined pressure Ppr1, the first on-off valve 75 disposed in the bypass line $L_{25}$ coupling the upstream and downstream sides of the dehydration solvent conveying pump 73 is closed, and the dehydration solvent conveying pump 73 operates. For this reason, even in the case where the internal pressure Pco of the contactor 62 is lower than the first predetermined pressure Ppr1, the dehydration solvent can be conveyed from the contactor 62 to the still column 72, and the process of removing moisture from the process gas by the dehydration solvent can be performed.

Also, in the case where the internal pressure Pco of the contactor 62 detected by the pressure sensor 69 is equal to or higher than the first predetermined pressure Ppr1, the first on-off valve 75 disposed in the bypass line $L_{25}$ coupling the upstream and downstream sides of the dehydration solvent conveying pump 73 is opened, and the dehydration solvent conveying pump 73 stops. For this reason, in the case where the internal pressure Pco of the contactor 62 is equal to or higher than the first predetermined pressure Ppr1, the dehydration solvent can be conveyed from the contactor 62 to the still column 72 by the internal pressure Pco of the contactor 62 without using the dehydration solvent conveying pump 73, and the process of removing moisture from the process gas by the dehydration solvent can be performed. In this way, according to the dehydration device 60 according to the present embodiment, it is possible to perform the process of removing moisture from the process gas with the dehydration solvent to prevent the occurrence of trouble such as corrosion in downstream equipment, even in cases where the interior of the contactor 62 is not sufficiently pressurized by the process gas.

Second Embodiment

Figure 5:
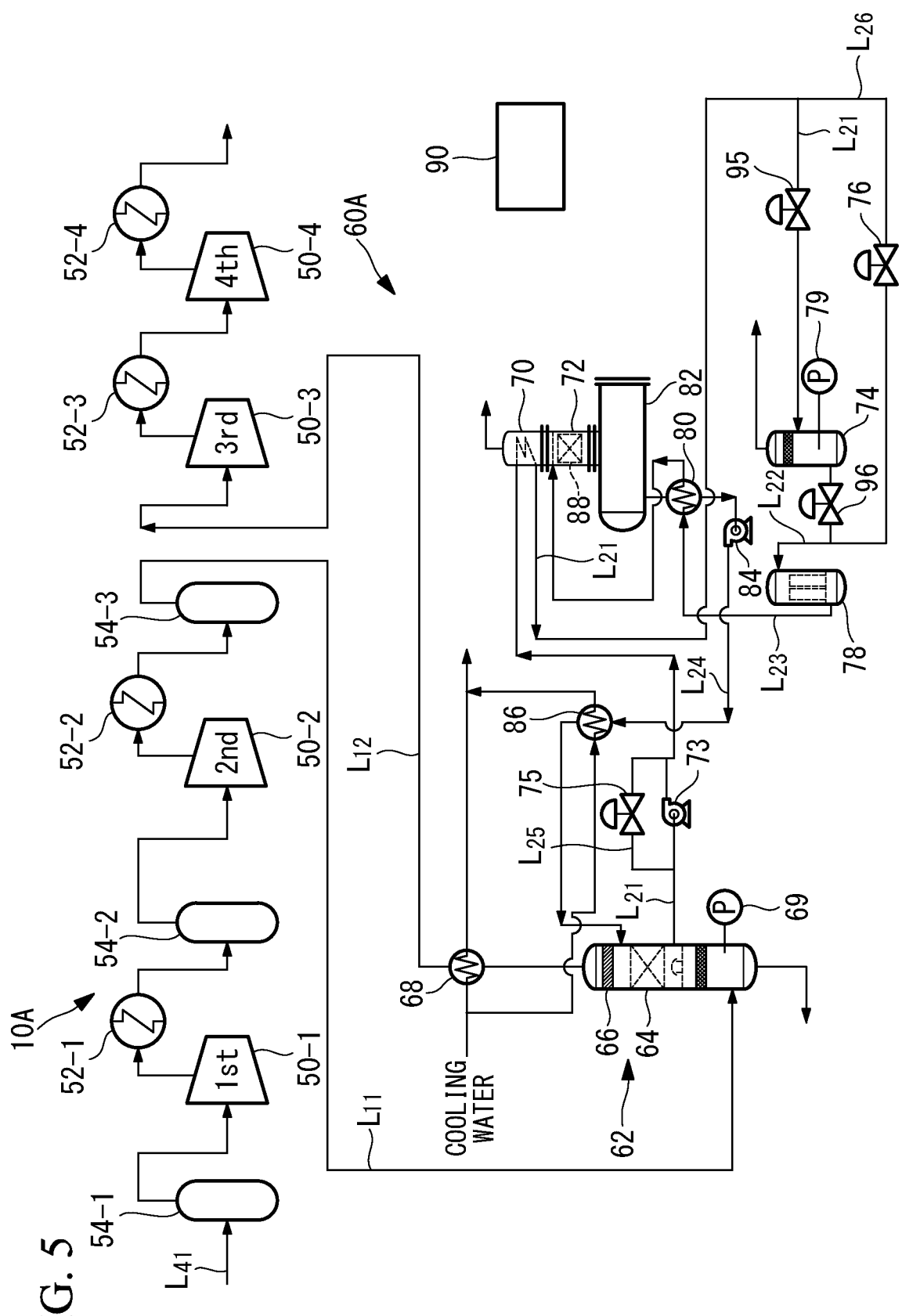
FIG. 5 is a configuration diagram of a dehydration-compression system according to a second embodiment.

Next, a dehydration-compression system 10A according to a second embodiment of the present disclosure will be described with reference to the drawings. FIG. 5 is a configuration diagram of the dehydration-compression system 10A according to the present embodiment. The present embodiment is a modification of the first embodiment. Except for the cases described particularly below, the present embodiment is taken to be similar to the first embodiment, and further description will be omitted hereinafter.

The dehydration-compression system 10 according to the first embodiment supplies compressed gas from the compressed gas source 77 to the flash drum 74 and causes the internal pressure Pfl of the flash drum 74 to be equal to or higher than the second predetermined pressure Ppr2. In contrast, the dehydration-compression system 10A according to the present embodiment is not provided with the compressed gas source 77, and the dehydration solvent does not pass through the flash drum 74 during the startup of the dehydration-compression system 10.

As illustrated in FIG. 5, a dehydration device 60A of the dehydration-compression system 10A according to the present embodiment is provided with a bypass line (second bypass line) $L_{26}$ that couples the dehydration solvent carrying line $L_{21}$ on the upstream side of the flash drum 74 and the dehydration solvent carrying line $L_{22}$ on the downstream side of the flash drum 74. The dehydration device 60A is provided with a second on-off valve 76 disposed in the bypass line $L_{26}$.

The on-off state of the second on-off valve 76 is controlled by a control signal transmitted from the control device 90 via a signal line (not illustrated). The second on-off valve 76 is closed in the case where the dehydration solvent supplied from the contactor 62 is supplied to the flash drum 74 through the dehydration solvent carrying line $L_{21}$, and is opened in the case where the dehydration solvent is not supplied to the flash drum 74.

As illustrated in FIG. 5, the dehydration device 60A is provided with an upstream on-off valve 95 disposed in the dehydration solvent carrying line $L_{21}$ on the upstream side of the flash drum 74 and a downstream on-off valve 96 disposed in the dehydration solvent carrying line $L_{22}$ on the downstream side of the flash drum 74. The upstream on-off valve 95 and the downstream on-off valve 96 are opened in the case where the dehydration solvent supplied from the contactor 62 is supplied to the flash drum 74 through the dehydration solvent carrying line $L_{21}$, and are closed in the case where the dehydration solvent is not supplied to the flash drum 74.

Figure 6:
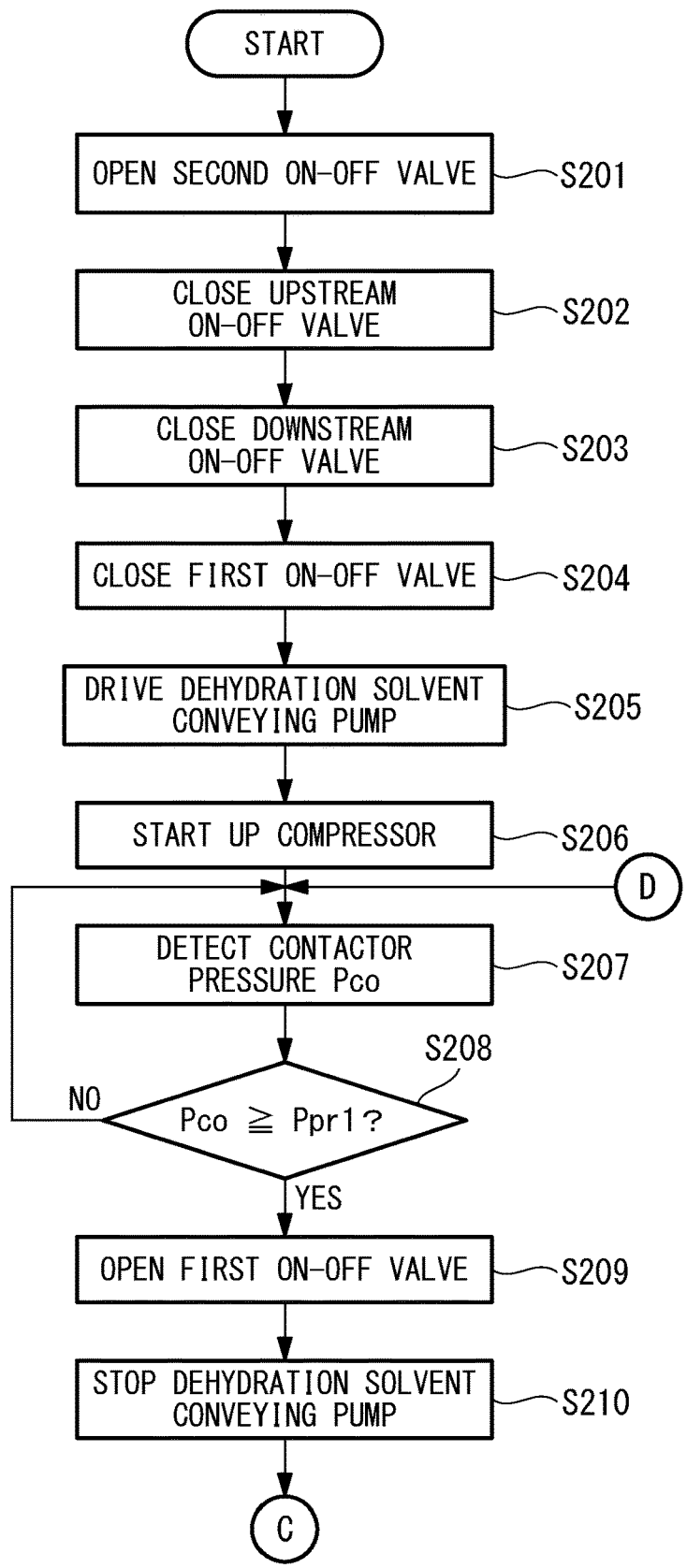
FIG. 6 is a flowchart illustrating a process executed by the dehydration-compression system according to the second embodiment.
Figure 7:
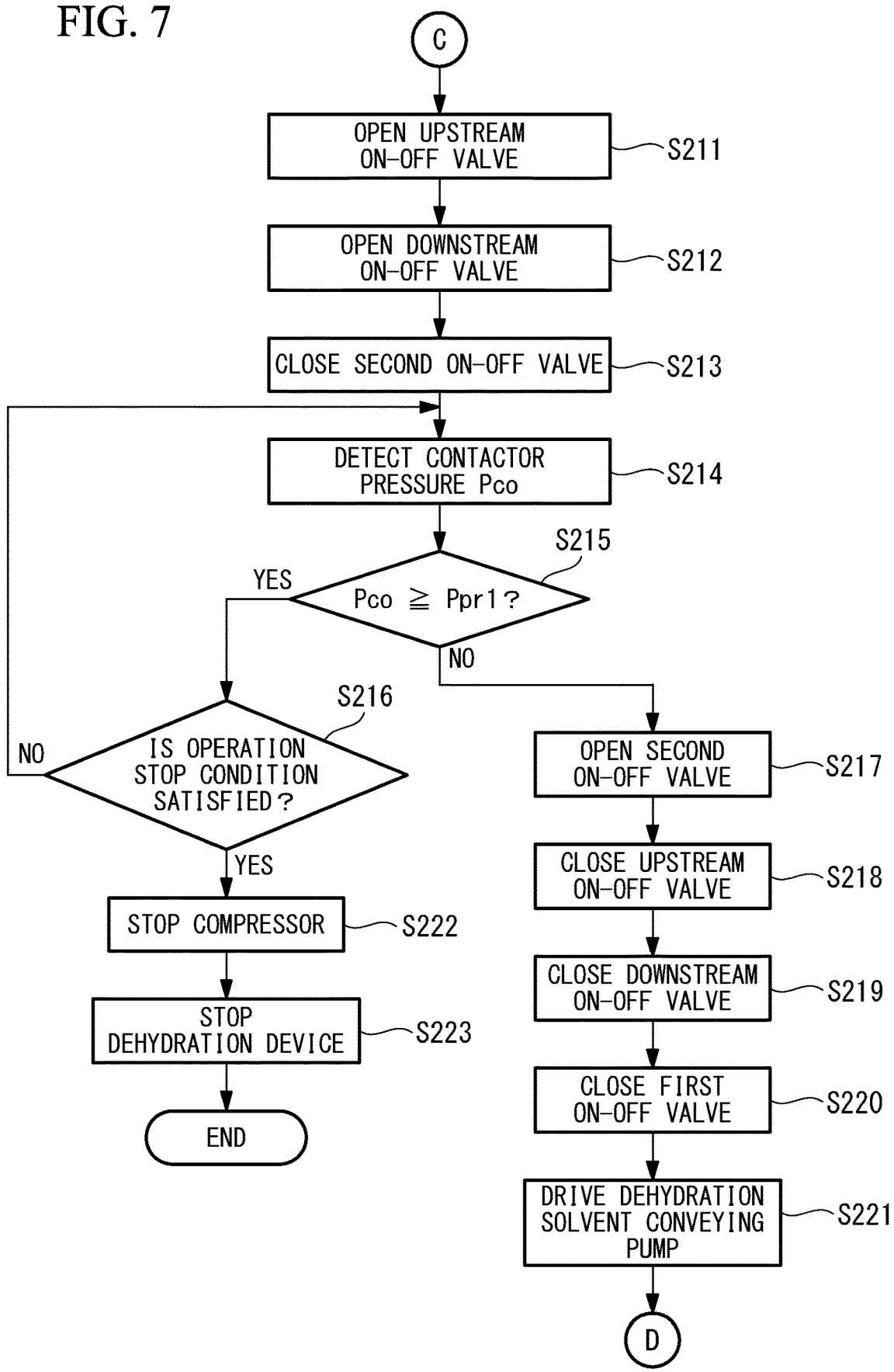
FIG. 7 is a flowchart illustrating a process executed by the dehydration-compression system according to the second embodiment.

Next, processes executed by the dehydration-compression system 10A according to the present embodiment will be described with reference to the drawings. FIGS. 6 and 7 are flowcharts illustrating processes executed by the dehydration-compression system 10A according to the present embodiment. Each process illustrated in FIGS. 6 and 7 is executed by the dehydration control device 90 that controls the dehydration device 60A and a compression control device (not illustrated) that controls the multiple compressors 50. Like the first embodiment, the processes illustrated in the flowcharts of FIGS. 6 and 7 are executed during startup of the dehydration-compression system 10A.

During startup of the dehydration-compression system 10, the process gas supplied to the contactor 62 is not compressed, and compressed gas is not being supplied to the flash drum 74. For this reason, the pressure difference with the internal pressure Pfl of the flash drum 74 does not become equal to or higher than Ppr1-Ppr2, and the dehydration solvent cannot be carried from the contactor 62 to the flash drum 74 through the dehydration solvent carrying line $L_{21}$ by the pressure of the process gas itself.

During the startup of the dehydration-compression system 10, the dehydration device 60 according to the first embodiment causes the pressure difference with the internal pressure Pfl of the flash drum 74 to be equal to or higher than Ppr1-Ppr2 by supplying compressed gas from the compressed gas source 77 to the flash drum 74. In contrast, during the startup of the dehydration-compression system 10A, the dehydration device 60A according to the present embodiment does not pass through the flash drum 74.

Specifically, in steps S201 to S203 illustrated in FIGS. 6 and 7, the dehydration control device 90 opens the second on-off valve 76 while closing the upstream on-off valve 95 and the downstream on-off valve 96, thereby causing the dehydration solvent to be conveyed from the contactor 62 to the still column 72 through the bypass line $L_{26}$.

In step S201, the dehydration control device 90 controls the second on-off valve 76 provided in the bypass line $L_{26}$ to open the second on-off valve 76.

In step S202, the dehydration control device 90 controls the upstream on-off valve 95 provided in the dehydration solvent carrying line $L_{21}$ on the upstream side of the flash drum 74 to close the upstream on-off valve 95.

In step S203, the dehydration control device 90 controls the downstream on-off valve 96 provided in the dehydration solvent carrying line $L_{22}$ on the downstream side of the flash drum 74 to close the downstream on-off valve 96.

In step S204, the dehydration control device 90 controls the first on-off valve 75 provided in the bypass line $L_{25}$ to close the first on-off valve 75.

In step S205, the dehydration control device 90 drives the dehydration solvent conveying pump 73 to convey the dehydration solvent from the contactor 62 to the still column 72 through the dehydration solvent carrying line $L_{21}$, the bypass line $L_{25}$, the bypass line $L_{26}$, the dehydration solvent carrying line $L_{22}$, and the dehydration solvent carrying line $L_{23}$. The dehydration solvent conveying pump 73 discharges the dehydration solvent supplied from the contactor 62 toward the still column 72.

Because the dehydration solvent conveying pump 73 is driven in step S205, the dehydration solvent is conveyed from the contactor 62 to the still column 72. Furthermore, by the action of the pump 84, the dehydration solvent is conveyed to the contactor 62 through the dehydration solvent carrying line $L_{24}$. In this way, the dehydration solvent circulates in order from the contactor 62, to the still column 72, and to the contactor 62.

In step S206, the compression control device (not illustrated) starts up all of the multiple compressors 50 and starts compression of the process gas supplied from the $CO_2$ recovery device 12. The compressor 50-1 and the compressor 50-2 compress the moisture-containing process gas supplied from the $CO_2$ recovery device 12, and supply the compressed process gas to the $CO_2$ supply line $L_{11}$ of the dehydration device 60. The compressor 50-3 and the compressor 50-4 compress the process gas with moisture removed that is supplied from the dehydration device 60, and supply the compressed process gas to downstream equipment.

In step S207, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S208, the dehydration control device 90 determines whether or not the pressure Pco transmitted from the pressure sensor 69 is equal to or higher than the first predetermined pressure Ppr1, and if YES, the process proceeds to step S209. If NO, the process of step S207 is re-executed.

In step S209, the dehydration control device 90 transmits a control signal for putting the first on-off valve 75 in the on state. The first on-off valve 75 enters the on state in response to the control signal transmitted from the dehydration control device 90. The first on-off valve 75 is put into the on state because the pressure Pco will become equal to or higher than the first predetermined pressure Ppr1, making it possible to convey the dehydration solvent from the contactor 62 to the flash drum 74 through the dehydration solvent carrying line $L_{21}$ by the pressure of the process gas itself.

In step S210, the dehydration control device 90 transmits a control signal for stopping the dehydration solvent conveying pump 73. In response to the control signal received from the dehydration control device 90, the dehydration solvent conveying pump 73 stops the action of suctioning and discharging the dehydration solvent.

In step S211, the dehydration control device 90 controls the upstream on-off valve 95 provided in the dehydration solvent carrying line $L_{21}$ on the upstream side of the flash drum 74 to open the upstream on-off valve 95.

In step S212, the dehydration control device 90 controls the downstream on-off valve 96 provided in the dehydration solvent carrying line $L_{22}$ on the downstream side of the flash drum 74 to open the downstream on-off valve 96.

In step S213, the dehydration control device 90 controls the second on-off valve 76 provided in the bypass line $L_{26}$ to close the second on-off valve 76. Because the second on-off valve 76 is closed while the upstream on-off valve 95 and the downstream on-off valve 96 are opened, the dehydration solvent is supplied from the contactor 62 to the flash drum 74.

In step S214, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S215, the dehydration control device 90 determines whether or not the pressure Pco transmitted from the pressure sensor 69 is equal to or higher than the first predetermined pressure Ppr1, and if YES, the process proceeds to step S216. If NO, the process proceeds to step S217.

In step S216, the dehydration control device 90 and the compression control device determine whether or not an operation stop condition for stopping the dehydration-compression system 10A is satisfied, and if YES, the process proceeds to step S222. If NO, step S214 is re-executed.

In step S217, the dehydration control device 90 controls the second on-off valve 76 provided in the bypass line $L_{26}$ to open the second on-off valve 76.

In step S218, the dehydration control device 90 controls the upstream on-off valve 95 provided in the dehydration solvent carrying line $L_{21}$ on the upstream side of the flash drum 74 to close the upstream on-off valve 95.

In step S219, the dehydration control device 90 controls the downstream on-off valve 96 provided in the dehydration solvent carrying line $L_{22}$ on the downstream side of the flash drum 74 to close the downstream on-off valve 96.

In step S220, the dehydration control device 90 controls the first on-off valve 75 provided in the bypass line $L_{25}$ to close the first on-off valve 75.

In step S221, the dehydration control device 90 drives the dehydration solvent conveying pump 73. Because the internal pressure Pco of the contactor 62 has fallen below the first predetermined pressure Ppr1, by driving the dehydration solvent conveying pump 73, the dehydration solvent continues to be conveyed from the contactor 62 to the flash drum 74. The dehydration solvent conveying pump 73 discharges the dehydration solvent supplied from the contactor 62 toward the flash drum 74, conveying the dehydration solvent through the dehydration solvent carrying line $L_{21}$.

In step S222, because the operation stop condition for stopping the dehydration-compression system 10A is satisfied, the compression control device stops all of the multiple compressors 50. By stopping the compressors 50, the supply of process gas from the compressors 50 to the $CO_2$ carrying line $L_{11}$ stops.

In step S223, because the operation stop condition for stopping the dehydration-compression system 10A is satisfied, the dehydration control device 90 stops the dehydration device 60A. Each unit of the dehydration device 60A stops operation in response to the control signal transmitted from the dehydration control device 90.

According to the dehydration device 60A of the present embodiment, for example, during startup when a process gas not sufficiently compressed by the compressors 50 is supplied and the internal pressure of the contactor 62 detected by the pressure sensor 69 is lower than the first predetermined pressure Ppr1, the second on-off valve 76 disposed in the bypass line $L_{26}$ coupling the upstream and downstream sides of the flash drum 74 is opened. For this reason, even in the case where the internal pressure Pfl of the flash drum 74 is insufficient to convey the dehydration solvent to the still column 72, the dehydration solvent can be conveyed from the contactor 62 to the still column 72, and the process of removing moisture from the process gas by the dehydration solvent can be performed. Also, the dehydration solvent can be conveyed from the contactor 62 to the still column 72 without providing a pressurizing source that pressurizes the interior of the flash drum 74.

Third Embodiment

Figure 8:
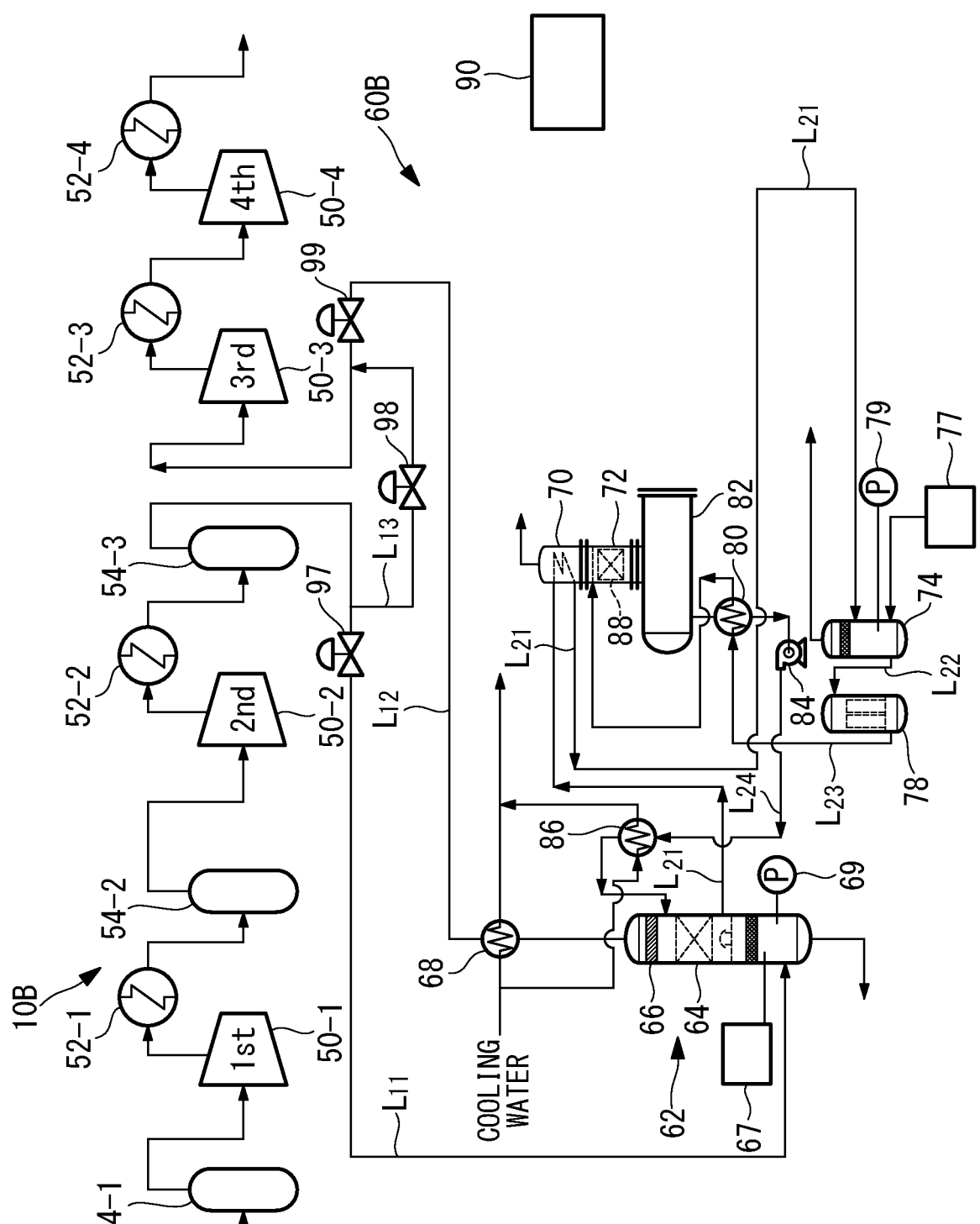
FIG. 8 is a configuration diagram of a dehydration-compression system according to a third embodiment.

Next, a dehydration-compression system 10B according to a third embodiment of the present disclosure will be described with reference to the drawings. FIG. 8 is a configuration diagram of the dehydration-compression system 10B according to the present embodiment. The present embodiment is a modification of the first embodiment. Except for the cases described particularly below, the present embodiment is taken to be similar to the first embodiment, and further description will be omitted hereinafter.

The dehydration-compression system 10 according to the first embodiment drives the dehydration solvent conveying pump 73 to convey the dehydration solvent from the contactor 62 to the flash drum 74 during startup when the internal pressure Pfl of the contactor 62 is lower than the first predetermined pressure Ppr1. In contrast, during startup, the dehydration-compression system 10B according to the present embodiment detours around the dehydration device 60B until the interior of the contactor 62 is pressurized to the first predetermined pressure Ppr1 or higher.

As illustrated in FIG. 8, the dehydration device 60A of the dehydration-compression system 10B according to the present embodiment is provided with a compressed gas source (pressurizing unit) 67, a coupling line $L_{13}$, a supply valve 97, a coupling valve 98, and a discharge valve 99. The compressed gas source 67, the supply valve 97, the coupling valve 98, and the discharge valve 99 are controlled by control signals transmitted from the dehydration control device 90.

The compressed gas source 67 is a device to supply a compressed gas (gas for pressurization) to the interior of the contactor 62. The compressed gas source 67 is supplied with a compressed gas (for example, compressed nitrogen or compressed air) at a predetermined pressure (for example, a pressure set in the range from 5 kg/cm² or greater to 10 kg/cm² or less).

The coupling line $L_{13}$ is a pipe that couples the $CO_2$ supply line $L_{11}$ and the dry $CO_2$ supply line $L_{12}$. During the startup of the dehydration-compression system 10B, the coupling line $L_{13}$ is used to detour around the dehydration device 60B until the interior of the contactor 62 is pressurized to the first predetermined pressure Ppr1 or higher.

The supply valve 97 is an on-off valve disposed in the $CO_2$ supply line Ln farther downstream than the position of coupling with the coupling line $L_{13}$. The supply valve 97 is opened in the case of supplying the process gas to the dehydration device 60B, and is closed in the case of detouring without supplying the process gas to the dehydration device 60B.

The coupling valve 98 is an on-off valve disposed in the coupling line $L_{13}$. The coupling valve 98 is closed in the case of supplying the process gas to the dehydration device 60B, and is opened in the case of detouring without supplying the process gas to the dehydration device 60B.

The discharge valve 99 is an on-off valve disposed in the dry $CO_2$ supply line $L_{12}$ farther upstream than the position of coupling with the coupling line $L_{13}$. The discharge valve 99 is opened in the case of supplying the process gas to the dehydration device 60B, and is closed in the case of detouring without supplying the process gas to the dehydration device 60B.

Figure 9:
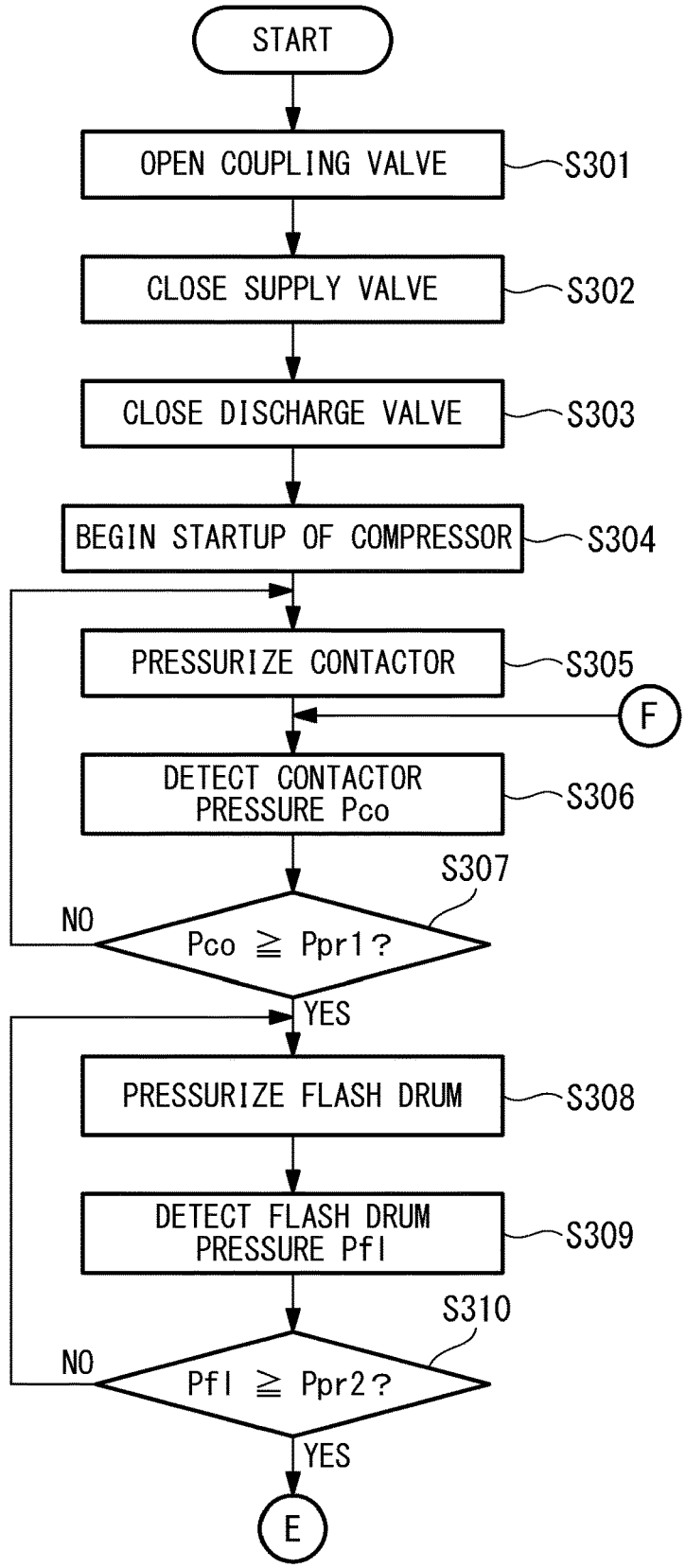
FIG. 9 is a flowchart illustrating a process executed by the dehydration-compression system according to the third embodiment.
Figure 10:
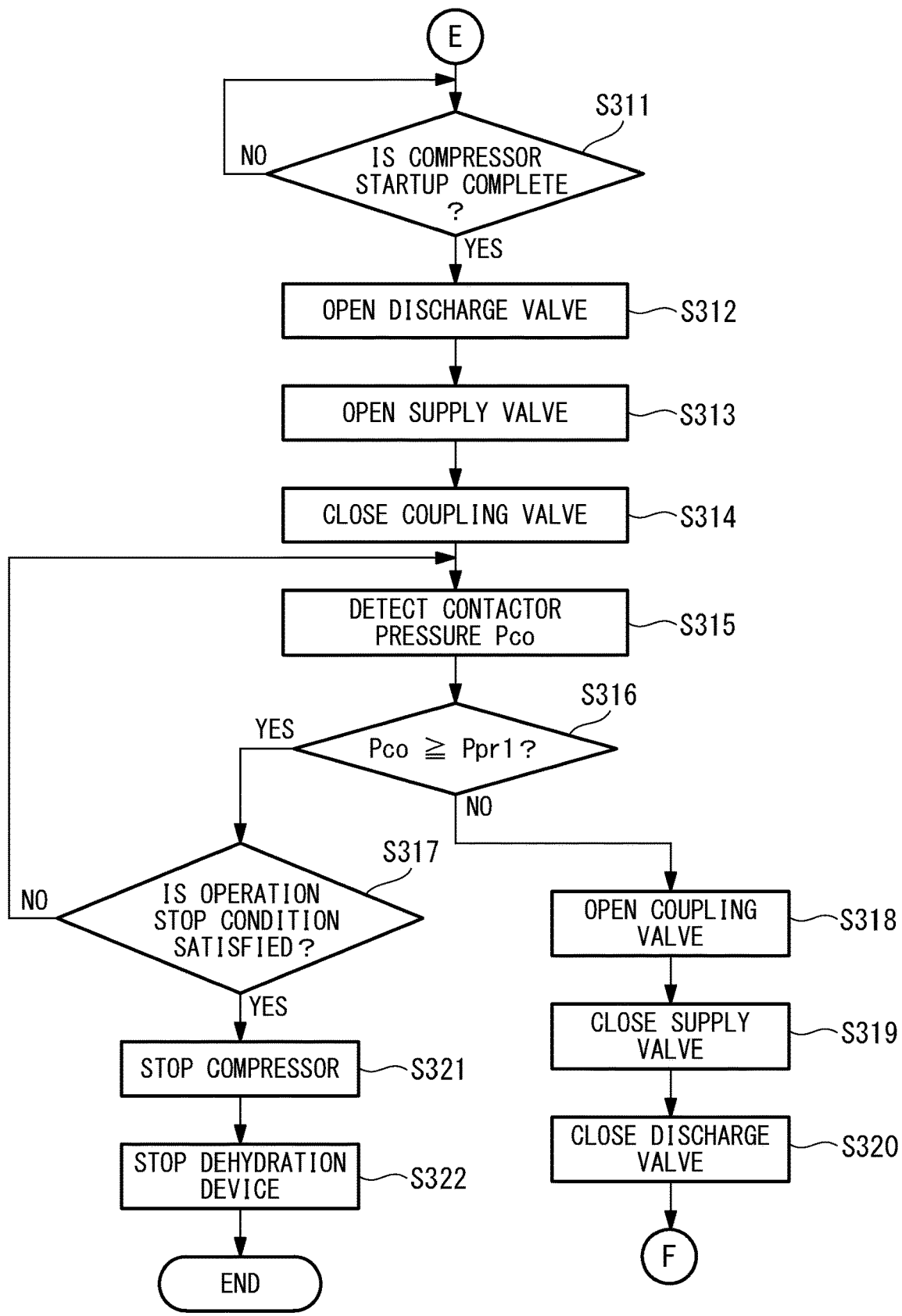
FIG. 10 is a flowchart illustrating a process executed by the dehydration-compression system according to the third embodiment.

Next, processes executed by the dehydration-compression system 10B according to the present embodiment will be described with reference to the drawings. FIGS. 9 and 10 are flowcharts illustrating processes executed by the dehydration-compression system 10B according to the present embodiment. Each process illustrated in FIGS. 9 and 10 is executed by the dehydration control device 90 that controls the dehydration device 60B and a compression control device (not illustrated) that controls the multiple compressors 50. Like the first embodiment, the processes illustrated in the flowcharts of FIGS. 9 and 10 are executed during startup of the dehydration-compression system 10B.

In step S301, the dehydration control device 90 controls the coupling valve 98 provided in the coupling line $L_{13}$ to open the coupling valve 98.

In step S302, the dehydration control device 90 controls the supply valve 97 provided in the $CO_2$ supply line $L_{11}$ to close the supply valve 97.

In step S303, the dehydration control device 90 controls the discharge valve 99 provided in the dry $CO_2$ supply line $L_{12}$ to close the discharge valve 99.

In step S304, the compression control device (not illustrated) controls the multiple compressors 50 to begin the startup of all of the compressors 50. The compressor 50-1 and the compressor 50-2 compress the moisture-containing process gas supplied from the $CO_2$ recovery device 12, and supply the compressed process gas from the $CO_2$ supply line $L_{21}$ to the coupling line $L_{13}$. The compressor 50-3 and the compressor 50-4 compress the moisture-containing process gas that is supplied from the coupling line $L_{13}$, and supply the compressed process gas to downstream equipment.

In step S305, the dehydration control device 90 controls how the compressed gas source 67 supplies the compressed gas to pressurize the contactor 62 to the first predetermined pressure Ppr1.

In step S306, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S307, the dehydration control device 90 determines whether or not the pressure Pco transmitted from the pressure sensor 69 is equal to or higher than the first predetermined pressure Ppr1, and if YES, the process proceeds to step S308. If NO, the process of step S305 is re-executed.

In step S308, the dehydration control device 90 controls how the compressed gas source 77 supplies the compressed gas to pressurize the flash drum 74 to the second predetermined pressure Ppr2.

In step S309, the dehydration control device 90 transmits a control signal causing the pressure sensor 79 to detect the internal pressure Pfl of the flash drum 74. The dehydration control device 90 detects the pressure Pfl transmitted from the pressure sensor 79 in response to the control signal transmitted to the pressure sensor 79.

In step S310, the dehydration control device 90 determines whether or not the pressure Pfl transmitted from the pressure sensor 79 is equal to or higher than the second predetermined pressure Ppr2, and if YES, the process proceeds to step S311. If NO, the process of step S308 is re-executed.

In step S311, the compression control device determines whether or not the startup of all of the multiple compressors 50 is complete, and if YES, the process proceeds to step S312. If NO, the process of step S311 is re-executed.

In step S312, the dehydration control device 90 controls the discharge valve 99 provided in the dry $CO_2$ supply line $L_{12}$ to open the discharge valve 99.

In step S313, the dehydration control device 90 controls the supply valve 97 provided in the $CO_2$ supply line $L_{11}$ to open the supply valve 97.

In step S314, the dehydration control device 90 controls the coupling valve 98 provided in the coupling line $L_{13}$ to close the coupling valve 98. When the discharge valve 99 and the supply valve 97 are opened and the coupling valve 98 is closed, the process gas supplied from the $CO_2$ recovery device 12 is supplied to the dehydration device 60B through the $CO_2$ supply line $L_{11}$.

In step S315, the dehydration control device 90 transmits a control signal causing the pressure sensor 69 to detect the internal pressure Pco of the contactor 62. The dehydration control device 90 detects the pressure Pco transmitted from the pressure sensor 69 in response to the control signal transmitted to the pressure sensor 69.

In step S316, the dehydration control device 90 determines whether or not the pressure Pco transmitted from the pressure sensor 69 is equal to or higher than the first predetermined pressure Ppr1, and if YES, the process proceeds to step S317. If NO, the process proceeds to step S318.

In step S317, the dehydration control device 90 and the compression control device determine whether or not an operation stop condition for stopping the dehydration-compression system 10B is satisfied, and if YES, the process proceeds to step S321. If NO, step S315 is re-executed.

In step S318, the dehydration control device 90 controls the coupling valve 98 provided in the coupling line $L_{13}$ to open the coupling valve 98.

In step S319, the dehydration control device 90 controls the supply valve 97 provided in the $CO_2$ supply line $L_{11}$ to close the supply valve 97.

In step S320, the dehydration control device 90 controls the discharge valve 99 provided in the dry $CO_2$ supply line $L_{12}$ to close the discharge valve 99.

In step S321, because the operation stop condition for stopping the dehydration-compression system 10B is satisfied, the compression control device stops all of the multiple compressors 50. By stopping the compressors 50, the supply of process gas from the compressors 50 to the $CO_2$ carrying line $L_{11}$ stops.

In step S322, because the operation stop condition for stopping the dehydration-compression system 10B is satisfied, the dehydration control device 90 stops the dehydration device 60B. Each unit of the dehydration device 60B stops operation in response to the control signal transmitted from the dehydration control device 90.

According to the dehydration device 60B of the present embodiment, for example, during startup when a process gas not sufficiently compressed by the compressors 50 is supplied and the internal pressure Pco of the contactor 62 detected by the pressure sensor 69 is lower than the first predetermined pressure Ppr1, the supply valve 97 is closed and the coupling valve 98 is opened, thereby leading the process gas supplied to the $CO_2$ supply line $L_{11}$ to the dry $CO_2$ supply line $L_{12}$ through the coupling line $L_{13}$. For this reason, in the case where the internal pressure Pco of the contactor 62 is lower than the first predetermined pressure Ppr1, the contactor 62 can be pressurized by the compressed gas supplied from the compressed gas source 67, without supplying the process gas to the contactor 62.

Also, in the case where the internal pressure Pco of the contactor 62 detected by the pressure sensor 69 is equal to or higher than the first predetermined pressure Ppr1, the supply valve 97 is opened and the coupling valve 98 is closed, thereby supplying the contactor 62 with the process gas supplied to the $CO_2$ supply line Ln. For this reason, in the case where the internal pressure Pco of the contactor 62 is equal to or higher than the first predetermined pressure Ppr1, the process gas can be supplied to the contactor 62, the dehydration solvent can be conveyed from the contactor 62 to the still column 72 by the internal pressure Pco of the contactor 62, and the process of removing moisture from the process gas by the dehydration solvent can be performed.

The dehydration device (60) according to each embodiment described above may be understood as follows, for example.

A dehydration device (60) according to the present disclosure removes moisture from a moisture-containing process gas compressed by a compressor (50), and is provided with: a absorbing unit (62) that causes the process gas to come into contact with a dehydration solvent, causing the dehydration solvent to absorb the moisture and remove the moisture from the process gas; a first pressure detecting unit (69) that detects an internal pressure of the absorbing unit; a distilling unit (72) that heats the dehydration solvent that has absorbed the moisture in the contactor, and separates the moisture from the dehydration solvent; a carrying line ($L_{21}$, $L_{23}$) that carries the dehydration solvent from the absorbing unit to the distilling unit; a conveying pump (73), disposed in the carrying line, that suctions the dehydration solvent carried from the absorbing unit and discharges the dehydration solvent toward the distilling unit; a first bypass line ($L_{25}$) that couples the carrying line upstream of the conveying pump and the carrying line downstream of the conveying pump; a first on-off valve (75) disposed in the first bypass line; and a control unit (90) that controls the conveying pump and the first on-off valve. The control unit is configured to close the first on-off valve and cause the conveying pump to operate in a case where the pressure detected by the first pressure detecting unit is lower than a first predetermined pressure, whereas the control unit is configured to open the first on-off valve and cause the conveying pump to stop in a case where the pressure detected by the first pressure detecting unit is equal to or higher than the first predetermined pressure.

According to the dehydration device according to the present disclosure, for example, during startup when process gas not sufficiently compressed by the compressor is supplied and the internal pressure of the absorbing unit detected by the first pressure detecting unit is lower than the first predetermined pressure, the first on-off valve disposed in the first bypass line coupling the upstream and downstream sides of the conveying pump is closed, and the conveying pump operates. For this reason, even in the case where the internal pressure of the absorbing unit is lower than the first predetermined pressure, the dehydration solvent can be conveyed from the absorbing unit to the distilling unit, and the process of removing moisture from the process gas by the dehydration solvent can be performed.

Also, in the case where the internal pressure of the absorbing unit detected by the first pressure detecting unit is equal to or higher than the first predetermined pressure, the first on-off valve disposed in the first bypass line coupling the upstream and downstream sides of the conveying pump is opened, and the conveying pump stops. For this reason, in the case where the internal pressure of the absorbing unit is equal to or higher than the first predetermined pressure, the dehydration solvent can be conveyed from the absorbing unit to the distilling unit by the internal pressure of the absorbing unit without using the conveying pump, and the process of removing moisture from the process gas by the dehydration solvent can be performed. In this way, according to the dehydration device according to the present disclosure, it is possible to perform the process of removing moisture from the process gas with the dehydration solvent to prevent the occurrence of trouble such as corrosion in downstream equipment, even in cases where the interior of the absorbing unit is not sufficiently pressurized by the process gas.

In the dehydration device according to the present disclosure, the first predetermined pressure is a pressure allowing the dehydration solvent to be conveyed from the absorbing unit to the distilling unit through the carrying line. In the case where the internal pressure of the absorbing unit is lower than the first predetermined pressure, the first on-off valve disposed in the first bypass line coupling the upstream and downstream sides of the conveying pump is closed, and the conveying pump operates. For this reason, it is possible to perform the process of removing moisture from the process gas with the dehydration solvent, even in cases where the interior of the absorbing unit is not sufficiently pressurized by the process gas.

A dehydration device according to the present disclosure is provided with: an evaporating unit (74), disposed in the carrying line, that reduces the pressure of the dehydration solvent and causes the process gas absorbed by the dehydration solvent to evaporate; a second bypass line ($L_{26}$) that couples the carrying line upstream of the evaporating unit and the carrying line downstream of the evaporating unit; and a second on-off valve (76) disposed in the second bypass line. In a case where the pressure detected by the first pressure detecting unit is lower than the first predetermined pressure, the control unit opens the second on-off valve, whereas in a case where the pressure detected by the first pressure detecting unit is equal to or higher than the first predetermined pressure, the control unit closes the second on-off valve.

According to the dehydration device according to the present disclosure, for example, during startup when a process gas not sufficiently compressed by the compressor is supplied and the internal pressure of the absorbing unit detected by the first pressure detecting unit is lower than the first predetermined pressure, the second on-off valve disposed in the second bypass line coupling the upstream and downstream sides of the evaporating unit is opened. For this reason, even in the case where the internal pressure of the evaporating unit is insufficient to convey the dehydration solvent to the distilling unit, the dehydration solvent can be conveyed from the absorbing unit to the distilling unit, and the process of removing moisture from the process gas by the dehydration solvent can be performed. Also, the dehydration solvent can be conveyed from the absorbing unit to the distilling unit without providing a pressurizing source that pressurizes the interior of the distilling unit.

Also, in a case where the internal pressure of the evaporating unit detected by a second pressure detecting unit is equal to or higher than a second predetermined pressure, the second on-off valve disposed in the second bypass line coupling the upstream and downstream sides of the evaporating unit is closed. For this reason, in the case where the internal pressure of the evaporating unit is equal to or higher than the second predetermined pressure and sufficient to appropriately evaporate the process gas absorbed by the dehydration solvent, the process gas absorbed by the dehydration solvent can be evaporated and the dehydration solvent is conveyed upstream, and the process of removing moisture from the process gas by the dehydration solvent can be performed.

In the dehydration device according to the present disclosure, the second predetermined pressure is a pressure allowing the dehydration solvent to be conveyed from the evaporating unit to the distilling unit through the carrying line. In the case where the internal pressure of the absorbing unit is lower than the first predetermined pressure, the second on-off valve disposed in the second bypass line coupling the upstream and downstream sides of the evaporating unit is opened. For this reason, even in the case where the interior of the evaporating unit is not sufficiently pressurized by the process gas, the dehydration solvent can be conveyed from the absorbing unit to the distilling unit, and the process of removing moisture from the process gas by the dehydration solvent can be performed.

A dehydration device (60) according to the present disclosure removes moisture from a moisture-containing process gas compressed by a compressor (50), and is provided with: a absorbing unit (62) that causes the process gas to come into contact with a dehydration solvent, causing the dehydration solvent to absorb the moisture and remove the moisture from the process gas; a pressurizing unit (67) that supplies a gas for pressurization to the absorbing unit; a pressure detecting unit (69) that detects an internal pressure of the absorbing unit; a distilling unit (72) that heats the dehydration solvent that has absorbed the moisture in the contactor, and separates the moisture from the dehydration solvent; a supply line ($L_{11}$) that supplies the process gas compressed by the compressor to the absorbing unit; a carrying line ($L_{21}$, $L_{23}$) that carries the dehydration solvent from the absorbing unit to the distilling unit; a discharge line ($L_{12}$) that discharges the process gas with the moisture removed in the absorbing unit; a coupling line ($L_{13}$) that couples the supply line and the discharge line; a supply valve (97) disposed in the supply line farther downstream than a position of coupling with the coupling line; a coupling valve (98) disposed in the coupling line; a discharge valve (99) disposed in the discharge line; and a control unit (90) that controls the supply valve, the coupling valve, and the discharge valve. In a case where the pressure detected by the pressure detecting unit is lower than a predetermined pressure, the control unit closes the supply valve and the discharge valve and opens the coupling valve, whereas in a case where the pressure detected by the pressure detecting unit is equal to or higher than the predetermined pressure, the control unit opens the supply valve and the discharge valve and closes the coupling valve.

According to the dehydration device according to the present disclosure, for example, during startup when a process gas not sufficiently compressed by the compressor is supplied and the internal pressure of the absorbing unit detected by the pressure detecting unit is lower than the predetermined pressure, the supply valve and the discharge valve are closed and the coupling valve is opened, thereby leading the process gas supplied to the supply line through the coupling line to the discharge line. For this reason, in the case where the internal pressure of the absorbing unit is lower than the predetermined pressure, the absorbing unit can be pressurized by the gas for pressurization supplied from the pressurizing unit, without supplying the process gas to the absorbing unit.

Also, in the case where the internal pressure of the absorbing unit detected by the pressure detecting unit is equal to or higher than the predetermined pressure, the supply valve and the discharge valve are opened and the coupling valve is closed, thereby supplying the absorbing unit with the process gas supplied to the supply line. For this reason, in the case where the internal pressure of the absorbing unit is equal to or higher than the predetermined pressure, the process gas can be supplied to the absorbing unit and the dehydration solvent can be conveyed from the absorbing unit to the distilling unit by the internal pressure of the absorbing unit, and the process of removing moisture from the process gas by the dehydration solvent can be performed.

In the dehydration device according to the present disclosure, the predetermined pressure is a pressure allowing the dehydration solvent to be conveyed from the absorbing unit to the distilling unit through the carrying line. In the case where the internal pressure of the absorbing unit is equal to or higher than the predetermined pressure, the process gas supplied to the supply line is supplied to the absorbing unit. For this reason, the dehydration solvent can be conveyed from the absorbing unit to the distilling unit by the internal pressure of the absorbing unit, and the process of removing moisture from the process gas by the dehydration solvent can be performed.

A dehydration-compression system (10) according to the present disclosure is provided with: the dehydration device according to any of the above; a first compressor (50-1, 50-2) that compresses a moisture-containing process gas; and a second compressor (50-3, 50-4) that is supplied with the process gas with the moisture removed from the dehydration device and also compresses the process gas.

According to the dehydration-compression system according to the present disclosure, it is possible to perform the process of removing moisture from the process gas with the dehydration solvent, even in cases where the interior of the absorbing unit is not sufficiently pressurized by the process gas. For this reason, it is possible to prevent the occurrence of trouble such as corrosion when a moisture-containing process gas is supplied to the second compressor that compresses the process gas supplied from the dehydration device.

A $CO_2$ recovery system according to the present disclosure is provided with: a $CO_2$ absorbing tower (22) that causes a $CO_2$-containing exhaust gas to come into contact with a $CO_2$ absorbing liquid and remove the $CO_2$ in the exhaust gas; an absorbing liquid regenerating tower (30) that causes the $CO_2$ to be released from the $CO_2$ absorbing liquid that has absorbed the $CO_2$ in the $CO_2$ absorbing tower; and the dehydration-compression system that compresses the $CO_2$ released in the absorbing liquid regenerating tower and also removes moisture contained in the $CO_2$.

According to the $CO_2$ recovery system according to the present disclosure, it is possible to perform the process of removing moisture from the process gas with the dehydration solvent, even in cases where the interior of the absorbing unit is not sufficiently pressurized by the process gas. For this reason, it is possible to prevent the occurrence of trouble such as corrosion when a moisture-containing process gas is supplied to the second compressor that compresses the process gas supplied from the dehydration device.

A dehydration device control method according to the present disclosure is a dehydration device control method that removes moisture from a moisture-containing process gas compressed by a compressor. The dehydration device includes: a absorbing unit that causes the process gas to come into contact with a dehydration solvent, causing the dehydration solvent to absorb the moisture and remove the moisture from the process gas; a distilling unit that heats the dehydration solvent that has absorbed the moisture in the contactor, and separates the moisture from the dehydration solvent; a carrying line that carries the dehydration solvent from the absorbing unit to the distilling unit; a conveying pump, disposed in the carrying line, that suctions the dehydration solvent carried from the absorbing unit and discharges the dehydration solvent toward the distilling unit; a first bypass line that couples the carrying line upstream of the conveying pump and the carrying line downstream of the conveying pump; and a first on-off valve disposed in the first bypass line. The method includes: a first pressure detecting step of detecting an internal pressure of the absorbing unit; a first controlling step of closing the first on-off valve and causing the conveying pump to operate in a case where the pressure detected in the first pressure detecting step is lower than a first predetermined pressure; and a second controlling step of opening the first on-off valve and stopping the conveying pump in a case where the pressure detected in the first pressure detecting step is equal to or higher than the first predetermined pressure.

According to the dehydration device control method according to the present disclosure, it is possible to perform the process of removing moisture from the process gas with the dehydration solvent to prevent the occurrence of trouble such as corrosion in downstream equipment, even in cases where the interior of the absorbing unit is not sufficiently pressurized by the process gas.

A dehydration device control method according to the present disclosure is a dehydration device control method that removes moisture from a moisture-containing process gas compressed by a compressor. The dehydration device includes: a absorbing unit that causes the process gas to come into contact with a dehydration solvent, causing the dehydration solvent to absorb the moisture and remove the moisture from the process gas; a pressurizing unit that supplies a gas for pressurization to the absorbing unit; a distilling unit that heats the dehydration solvent that has absorbed the moisture in the contactor, and separates the moisture from the dehydration solvent; a supply line that supplies the process gas compressed by the compressor to the absorbing unit; a carrying line that carries the dehydration solvent from the absorbing unit to the distilling unit; a discharge line that discharges the process gas with the moisture removed in the absorbing unit; a coupling line that couples the supply line and the discharge line; a supply valve disposed in the supply line farther downstream than a position of coupling with the coupling line; a coupling valve disposed in the coupling line; and a discharge valve disposed in the discharge line. The method includes: a pressure detecting step of detecting an internal pressure of the absorbing unit; a first controlling step of closing the supply valve and the discharge valve and opening the coupling valve in a case where the pressure detected in the pressure detecting step is lower than a predetermined pressure; and a second controlling step of opening the supply valve and the discharge valve and closing the coupling valve in a case where the pressure detected in the pressure detecting step is equal to or higher than the predetermined pressure.

According to the dehydration device control method according to the present disclosure, in the case where the internal pressure of the absorbing unit is lower than the predetermined pressure, the absorbing unit can be pressurized by the gas for pressurization supplied from the pressurizing unit, without supplying the process gas to the absorbing unit. Also, in the case where the internal pressure of the absorbing unit is equal to or higher than the predetermined pressure, the process gas can be supplied to the absorbing unit and the dehydration solvent can be conveyed from the absorbing unit to the distilling unit by the internal pressure of the absorbing unit, and the process of removing moisture from the process gas by the dehydration solvent can be performed.

REFERENCE SIGNS LIST 10, 10A, 10B Dehydration-compression system
$CO_2$ absorbing tower
Absorbing liquid regenerating tower
50, 50-1, 50-2, 50-3, 50-4 Compressor
60, 60A, 60B Dehydration device
62 Contactor (absorbing unit)
67 Compressed gas source (pressurizing unit)
69 Pressure sensor (first pressure detecting unit)
72 Still column (distilling unit)
73 Dehydration solvent conveying pump
74 Flash drum (evaporating unit)
75 First on-off valve
76 Second on-off valve
77 Compressed gas source
79 Pressure sensor (second pressure detecting unit)
84 Pump
90 Dehydration control device (control unit)
95 Upstream on-off valve
96 Downstream on-off valve
97 Supply valve
98 Coupling valve
99 Discharge valve
$L_{11}$ $CO_2$ supply line
$L_{12}$ Dry $CO_2$ supply line
$L_{13}$ Coupling line
$L_{21}$, $L_{22}$, $L_{23}$, $L_{24}$ Dehydration solvent carrying line
$L_{25}$ Bypass line (first bypass line)
$L_{26}$ Bypass line (second bypass line)

The invention claimed is:

1. A dehydration device that removes moisture from a moisture-containing process gas compressed by a compressor, comprising:
an absorbing unit that causes the process gas to come into contact with a dehydration solvent, causing the dehydration solvent to absorb the moisture and remove the moisture from the process gas;
a first pressure detecting unit that detects an internal pressure of the absorbing unit;

a distilling unit that heats the dehydration solvent that has absorbed the moisture in the absorbing unit, and separates the moisture from the dehydration solvent;

a carrying line that carries the dehydration solvent from the absorbing unit to the distilling unit;

a conveying pump, disposed in the carrying line, that suctions the dehydration solvent carried from the absorbing unit and discharges the dehydration solvent toward the distilling unit;

a first bypass line that couples the carrying line upstream of the conveying pump and the carrying line downstream of the conveying pump;

a first on-off valve disposed in the first bypass line; and a control unit that controls the conveying pump and the first on-off valve, wherein the control unit is configured to close the first on-off valve and cause the conveying pump to operate in a case where the pressure detected by the first pressure detecting unit is lower than a first predetermined pressure, whereas the control unit is configured to open the first on-off valve and cause the conveying pump to stop in a case where the pressure detected by the first pressure detecting unit is equal to or higher than the first predetermined pressure.

2. The dehydration device according to claim 1, wherein the first predetermined pressure is a pressure allowing the dehydration solvent to be conveyed from the absorbing unit to the distilling unit through the carrying line.

3. The dehydration device according to claim 1, further comprising:

an evaporating unit, disposed in the carrying line, that reduces the pressure of the dehydration solvent and causes the process gas absorbed by the dehydration solvent to evaporate;

a second bypass line that couples the carrying line upstream of the evaporating unit and the carrying line downstream of the evaporating unit; and a second on-off valve disposed in the second bypass line, wherein the control unit is configured to open the second on-off valve in a case where the pressure detected by the first pressure detecting unit is lower than the first predetermined pressure, whereas the control unit closes the second on-off valve in a case where the pressure detected by the first pressure detecting unit is equal to or higher than the first predetermined pressure.

4. The dehydration device according to claim 3, wherein the first predetermined pressure is a pressure allowing the dehydration solvent to be conveyed from the absorbing unit to the distilling unit through the carrying line.

5. A dehydration device that removes moisture from a moisture-containing process gas compressed by a compressor, comprising:

a absorbing unit that causes the process gas to come into contact with a dehydration solvent, causing the dehydration solvent to absorb the moisture and remove the moisture from the process gas;

a pressurizing unit that supplies a gas for pressurization to the absorbing unit;

a pressure detecting unit that detects an internal pressure of the absorbing unit;

a distilling unit that heats the dehydration solvent that has absorbed the moisture in the absorbing unit, and separates the moisture from the dehydration solvent;

a supply line that supplies the process gas compressed by the compressor to the absorbing unit;

a carrying line that carries the dehydration solvent from the absorbing unit to the distilling unit;

a discharge line that discharges the process gas with the moisture removed in the absorbing unit;

a coupling line that couples the supply line and the discharge line;

a supply valve disposed in the supply line farther downstream than a position of coupling with the coupling line;

a coupling valve disposed in the coupling line;

a discharge valve disposed in the discharge line; and a control unit that controls the supply valve, the coupling valve, and the discharge valve, wherein the control unit is configured to close the supply valve and the discharge valve and open the coupling valve in a case where the pressure detected by the pressure detecting unit is lower than a predetermined pressure, whereas the control unit is configured to open the supply valve and the discharge valve and close the coupling valve in a case where the pressure detected by the pressure detecting unit is equal to or higher than the predetermined pressure.

6. The dehydration device according to claim 5, wherein the predetermined pressure is a pressure allowing the dehydration solvent to be conveyed from the absorbing unit to the distilling unit through the carrying line.

7. A dehydration-compression system comprising:

the dehydration device according to claim 1;

a first compressor that compresses the moisture-containing process gas; and a second compressor that is supplied with the process gas with the moisture removed from the dehydration device and also compresses the process gas.

8. A $CO_2$ recovery system comprising:

a $CO_2$ absorbing tower that causes a $CO_2$-containing exhaust gas to come into contact with a $CO_2$ absorbing liquid and remove the $CO_2$ in the exhaust gas;

an absorbing liquid regenerating tower that causes the $CO_2$ to be released from the $CO_2$ absorbing liquid that has absorbed the $CO_2$ in the $CO_2$ absorbing tower; and the dehydration-compression system according to claim 7 that compresses the $CO_2$ released in the absorbing liquid regenerating tower and also removes moisture contained in the $CO_2$.

9. A dehydration device control method that removes moisture from a moisture-containing process gas compressed by a compressor, the dehydration device including:

a absorbing unit that causes the process gas to come into contact with a dehydration solvent, causing the dehydration solvent to absorb the moisture and remove the moisture from the process gas;

a distilling unit that heats the dehydration solvent that has absorbed the moisture in the absorbing unit, and separates the moisture from the dehydration solvent;

a carrying line that carries the dehydration solvent from the absorbing unit to the distilling unit;

a conveying pump, disposed in the carrying line, that suctions the dehydration solvent carried from the absorbing unit and discharges the dehydration solvent toward the distilling unit;

a first bypass line that couples the carrying line upstream of the conveying pump and the carrying line downstream of the conveying pump; and a first on-off valve disposed in the first bypass line, the method comprising:

a first pressure detecting step of detecting an internal pressure of the absorbing unit;

a first controlling step of closing the first on-off valve and causing the conveying pump to operate in a case where the pressure detected in the first pressure detecting step is lower than a first predetermined pressure; and a second controlling step of opening the first on-off valve and stopping the conveying pump in a case where the pressure detected in the first pressure detecting step is equal to or higher than the first predetermined pressure.

10. A dehydration device control method that removes moisture from a moisture-containing process gas compressed by a compressor, the dehydration device including:

a absorbing unit that causes the process gas to come into contact with a dehydration solvent, causing the dehydration solvent to absorb the moisture and remove the moisture from the process gas;

a pressurizing unit that supplies a gas for pressurization to the absorbing unit;

a distilling unit that heats the dehydration solvent that has absorbed the moisture in the absorbing unit, and separates the moisture from the dehydration solvent;

a supply line that supplies the process gas compressed by the compressor to the absorbing unit;

a carrying line that carries the dehydration solvent from the absorbing unit to the distilling unit;

a discharge line that discharges the process gas with the moisture removed in the absorbing unit;

a coupling line that couples the supply line and the discharge line;

a supply valve disposed in the supply line farther downstream than a position of coupling with the coupling line;

a coupling valve disposed in the coupling line; and a discharge valve disposed in the discharge line, the method comprising:

a pressure detecting step of detecting an internal pressure of the absorbing unit;

a first controlling step of closing the supply valve and the discharge valve and opening the coupling valve in a case where the pressure detected in the pressure detecting step is lower than a predetermined pressure; and a second controlling step of opening the supply valve and the discharge valve and closing the coupling valve in a case where the pressure detected in the pressure detecting step is equal to or higher than the predetermined pressure.

\* \* \* \* \*